United States Patent
Satou

(10) Patent No.: US 9,735,915 B2
(45) Date of Patent: Aug. 15, 2017

(54) OPTICAL BRANCHING/INSERTION DEVICE, OPTICAL BRANCHING/INSERTION METHOD AND RECORDING MEDIUM

(71) Applicant: NEC Corporation, Tokyo (JP)

(72) Inventor: Yoshirou Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 54 days.

(21) Appl. No.: 14/761,376

(22) PCT Filed: Jan. 17, 2014

(86) PCT No.: PCT/JP2014/000211
§ 371 (c)(1),
(2) Date: Jul. 16, 2015

(87) PCT Pub. No.: WO2014/115517
PCT Pub. Date: Jul. 31, 2014

(65) Prior Publication Data
US 2015/0349879 A1    Dec. 3, 2015

(30) Foreign Application Priority Data

Jan. 23, 2013   (JP) ................................. 2013-009831

(51) Int. Cl.
*H04B 10/29*    (2013.01)
*H04J 14/02*    (2006.01)
(Continued)

(52) U.S. Cl.
CPC ........ *H04J 14/0221* (2013.01); *H04B 10/032* (2013.01); *H04B 10/294* (2013.01); *H04J 14/0213* (2013.01); *H04J 14/0295* (2013.01)

(58) Field of Classification Search
CPC . H04J 14/06; H04J 14/02; H04J 14/00; H04B 10/61; H04B 10/613;
(Continued)

(56) References Cited

U.S. PATENT DOCUMENTS

2010/0178051 A1* 7/2010 Mizutani ............... H04J 3/0652
                                                              398/25
2011/0076017 A1   3/2011 Midorikawa et al.
(Continued)

FOREIGN PATENT DOCUMENTS

EP    2 490 353 A1   8/2012
JP    2002-185407    6/2002
(Continued)

OTHER PUBLICATIONS

Machine English translation of JP 2012-182725A. Nov. 3, 2016. pp. 1-29.*

(Continued)

*Primary Examiner* — Don N Vo
(74) *Attorney, Agent, or Firm* — Finnegan, Henderson, Farabow, Garrett & Dunner, L.L.P.

(57) ABSTRACT

[Objective] To make it possible to effectively relay remaining signals even when any input failure occurs on a propagation path.
[Solution] Provided is an optical branching/insertion device including: a trunk-side detection/branching unit for detecting a failure of a trunk-side optical signal inputted from the trunk side and outputting it as a first detection result, and for splitting the trunk-side optical signal and sending the split signals respectively to the trunk side and to the branch side; a branch-side detection unit for detecting a failure of a branch-side optical signal inserted from the branch side and outputting it as a second detection result, and for sending the branch-side optical signal as an insertion signal; an insertion (Continued)

signal adjustment unit for outputting the insertion signal with its pass-through degree having been adjusted on the basis of the first detection result, as a first adjusted signal; a trunk signal adjustment unit for outputting the trunk-side optical signal with its pass-through degree having been adjusted on the basis of the first detection result, as a second adjusted signal; and a combining/output unit for outputting, to the outside, an optical signal into which the first adjusted signal and the second adjusted signal are combined together, as a trunk-side output optical signal.

15 Claims, 10 Drawing Sheets

(51) Int. Cl.
*H04B 10/294* (2013.01)
*H04B 10/032* (2013.01)

(58) Field of Classification Search
CPC ............ H04B 10/2569; H04B 10/6161; G02B 6/12004; G02B 6/2773
USPC .......................................................... 398/5
See application file for complete search history.

(56) References Cited

U.S. PATENT DOCUMENTS

| | | | |
|---|---|---|---|
| 2011/0200322 A1 | 8/2011 | Kovsh et al. | |
| 2012/0177362 A1* | 7/2012 | Zhang | H04B 10/0773 398/9 |

FOREIGN PATENT DOCUMENTS

| | | |
|---|---|---|
| JP | 2006-66946 | 3/2006 |
| JP | 2006-310963 | 11/2006 |
| JP | 2012-182725 | 9/2012 |
| JP | 2012-195714 | 10/2012 |
| WO | WO 2004/088893 A1 | 10/2004 |

OTHER PUBLICATIONS

Japanese Office Action mailed Aug. 23, 2016, by the Japanese Patent Office in counterpart Japanese Patent Application No. 2014-558490.

International Search Report and Written Opinion mailed Apr. 1, 2014 in corresponding PCT International Application.

Extended European Search Report mailed on Sep. 21, 2016, by the European Patent Office in counterpart European Patent Application No. 14743558.0.

* cited by examiner

OPTICAL BRANCHING/INSERTION DEVICE, OPTICAL BRANCHING/INSERTION METHOD AND RECORDING MEDIUM

CROSS-REFERENCE TO RELATED PATENT APPLICATIONS

This application is a National Stage Entry of International Application No. PCT/JP2014/000211, filed Jan. 17, 2014, which claims priority from Japanese Patent Application No. 2013-009831, filed Jan. 23, 2013. The entire contents of the above-referenced applications are expressly incorporated herein by reference.

TECHNICAL FIELD

The present invention relates to an optical relay device, and in particular, to an optical branching/insertion device which performs splitting and mixing of optical signals depending on specific wavelengths, an optical branching/insertion method for performing the same, and a recording medium.

BACKGROUND ART

In recent years, with the spread of the internet, demand for international telecommunications to process large-volume contents such as voices and video images has been rapidly increasing. Accordingly, optical wavelength division multiplexing communication, where a plurality of optical signals of different wavelengths are simultaneously transmitted on a single optical fiber cable, has been widely used as a high-speed and large-capacity information communication means.

In particular, submarine cable systems are required to have very high reliability, because they are installed in deep sea and accordingly cannot be easily repaired. Because of this condition, research and development has been conducted on accuracy improvement and mutual interaction of a large number of relay devices intervening between the submarine cable systems.

FIG. 10 is a block diagram showing a configuration diagram of a typical optical branching/insertion device 700 existing between submarine cable systems. The optical branching/insertion device 700 comprises an optical coupler 200, an optical filter 400, an optical filter 500 and an optical coupler 600. The optical coupler 200 splits a trunk-side optical signal inputted from the outside and outputs the split signals respectively to the inside of the optical branching/insertion device 700 and to the brunch side. The optical filter 400 passes only a specific optical signal component (insertion signal) out of a brunch-side optical signal. The optical filter 500 passes only a specific optical signal component (pass-through signal) out of the trunk-side optical signal. The optical coupler 600 passes the specific optical signal component (insertion signal) out of the brunch-side optical signal, and combines the optical signal component thus passed with light outputted from the optical filter 500.

However, in the above-described configuration, if an input failure of the trunk-side optical signal occurs, no pass-through signal is inputted to the optical branching/insertion device 700. In that case, only an insertion signal is transmitted to the subsequent stage, and accordingly, there arises a problem of reduction in the total power. If an input failure of the brunch-side optical signal occurs, no insertion signal is inputted to the optical branching/insertion device 700. In that case, only a pass-through signal is transmitted to the subsequent stage, and accordingly, there also arises a problem of reduction in the total power.

In terms of the problem described above, for example, PTL 1 and PTL 2 each describe a technology for making the total power of output light having been propagated through an optical fiber equivalent to that of the incident light.

In the technology of PTL 1, a total sum of powers of an optical signal inputted from a trunk line and that from a brunch line is compared with a threshold value set in advance. On the basis of the comparison result, the power of the input optical signal from the trunk line is controlled.

In the technology of PTL 2, when an optical input at the front stage of the device becomes in a no-input state owing to a transmission line failure or the like, inputted spontaneous emission light is adjusted to have the same level of output power as that of a pass-through optical signal in the ordinary state, and the adjusted light is outputted as compensation light.

CITATION LIST

Patent Literature

[PTL 1] Re-publication of PCT International Publication No. 2004/088893
[PTL 2] Japanese Patent Application Laid-Open No. 2006-66946

SUMMARY OF INVENTION

Technical Problem

However, in an optical branching device of PTL 1, the power of an optical signal inputted from the trunk line is controlled on the basis of whether the level of the input signal falls within a range between two threshold values set in advance. Accordingly, the optical branching device has a problem of variation in the total power outputted to the outside, and also a problem of inability to adjust the input/output power on a per-wavelength basis.

An optical branching/insertion device disclosed in PTL 2 has a problem in that its overall configuration becomes complicated, and also a problem in that, if a failure occurs in inputting an optical signal to be inserted, only a pass-through optical signal or compensation light is outputted.

In general optical repeaters of submarine cable systems, constant excitation light control requiring a relatively simple circuit configuration is employed, instead of constant gain control. Therefore, even when the input power has become low, as a result of passing through some number of optical repeaters, the total output power becomes almost equal to that in the normal state.

Accordingly, in the technologies described in PTL 1 and PTL 2, it is anticipated that, when an input failure occurs, the transmission characteristics are degraded by a nonlinear effect which causes increase in the power per wavelength. An optical signal other than that for which the input failure has occurred is amplified to have a power exceeding an intended value. That is, there occurs an "optical nonlinear phenomenon" which is a phenomenon where the intensity of output light after propagation through an optical fiber is not proportional to the intensity of the incident light. The optical nonlinear phenomenon makes it impossible for the reception side to properly receive optical signals.

Objective of Invention

The objective of the present invention is to provide an optical branching/insertion device, an optical branching/ insertion method and a recording medium, all of which enable it to effectively relay remaining signals even when an input failure occurs.

Solution to Problem

An optical branching/insertion device of the present invention comprises: a trunk-side detection/branching means which detects a failure of a trunk-side optical signal inputted from the trunk side and outputs it as a first detection result, and splits the trunk-side optical signal and sends the split signals respectively to the trunk side and to the branch side; a branch-side detection means which detects a failure of a branch-side optical signal inserted from the branch side and outputs it as a second detection result, and sends the branch-side optical signal as an insertion signal; an insertion signal adjustment device which outputs the insertion signal whose pass-through degree has been adjusted on the basis of the first detection result, as a first adjusted signal; a trunk signal adjustment device which outputs the trunk-side optical signal whose pass-through degree has been adjusted on the basis of the second detection result, as a second adjusted signal; and a combining/output means which outputs, to the outside, an optical signal into which the first adjusted signal and the second adjusted signal are combined together, as a trunk-side output optical signal.

An optical branching/insertion method of the present invention is characterized by that it comprises: detecting a failure of a trunk-side optical signal inputted from the trunk side and outputting it as a first detection result, and splitting the trunk-side optical signal and sending the split signals respectively to the trunk side and to the branch side; detecting a failure of a branch-side optical signal inserted from the branch side and outputting it as a second detection result, and sending the branch-side optical signal as an insertion signal; outputting the insertion signal whose pass-through degree has been adjusted on the basis of the first detection result, as a first adjusted signal; outputting the trunk-side optical signal whose pass-through degree has been adjusted on the basis of the second detection result, as a second adjusted signal; and outputting, to the outside, an optical signal into which the first adjusted signal and the second adjusted signal are combined together, as a trunk-side output optical signal.

A recording medium of the present invention stores an optical branching/insertion program for causing a computer to realize: a trunk-side detection/branching function to detect a failure of a trunk-side optical signal inputted from the trunk side and output it as a first detection result, and to split the trunk-side optical signal and send the split signals respectively to the trunk side and to the branch side; a branch-side detection function to detect a failure of a branch-side optical signal inserted from the branch side and output it as a second detection result, and to send the branch-side optical signal as an insertion signal; an insertion signal adjustment function to output the insertion signal whose pass-through degree has been adjusted on the basis of the first detection result, as a first adjusted signal; a trunk signal adjustment function to output the trunk-side optical signal whose pass-through degree has been adjusted on the basis of the second detection result, as a second adjusted signal; and a combining/output function to output, to the outside, an optical signal into which the first adjusted signal and the second adjusted signal are combined together, as a trunk-side output optical signal.

Advantageous Effects of Invention

According to the present invention, even when an input failure occurs, remaining signals are effectively relayed.

DESCRIPTION OF EMBODIMENTS

First Exemplary Embodiment

Figure 1:
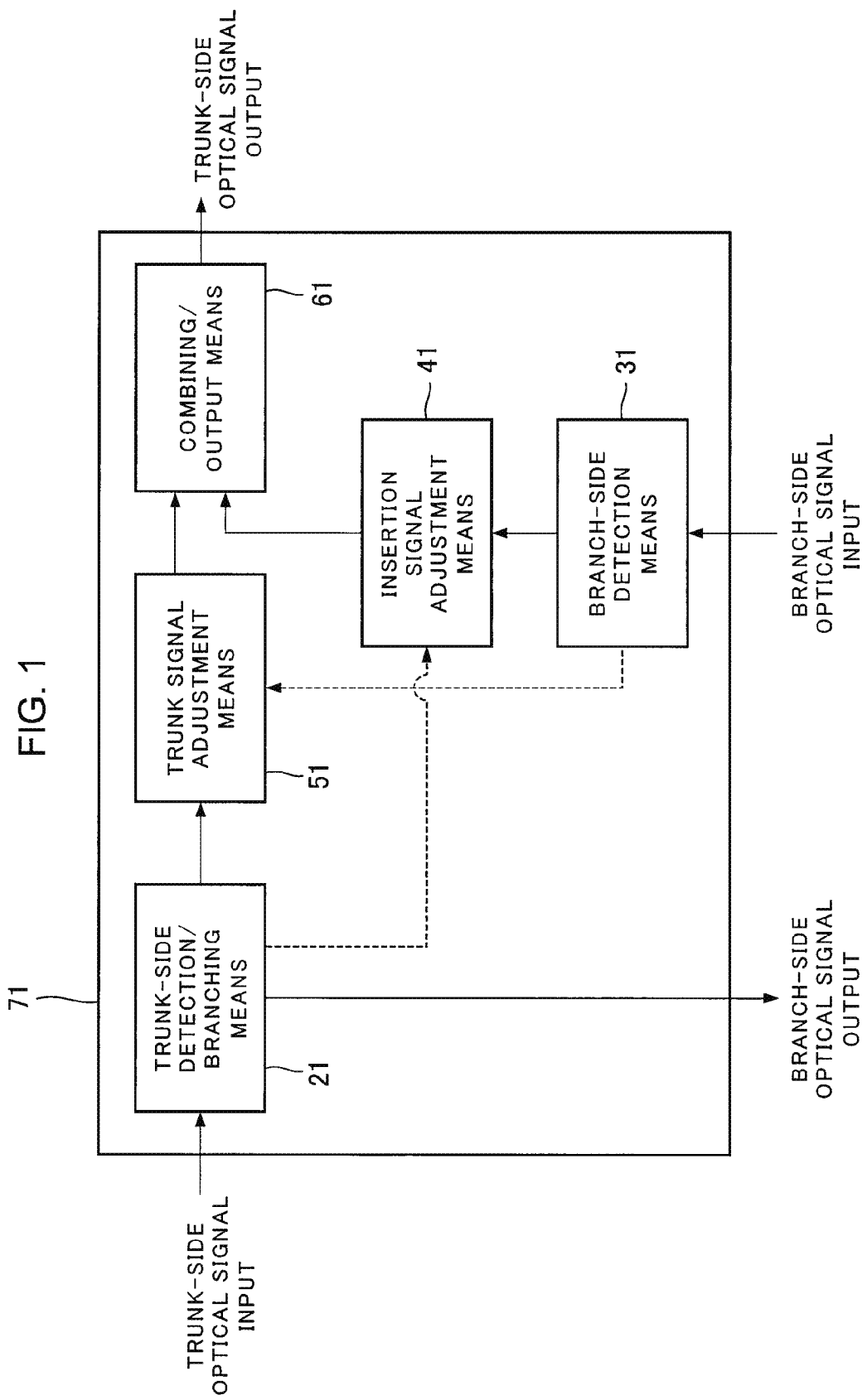
FIG. 1 A block diagram showing an example of a basic configuration of an optical branching/insertion device according to a first exemplary embodiment of the present invention FIG. 2 A block diagram showing an example of a specific configuration of the optical branching/insertion device shown in FIG. 1

A first exemplary embodiment of an optical branching/insertion device according to the present invention will be described, with reference to FIGS. 1 to 7.

(Basic Configuration)

The optical branching/insertion device 71 according to the first exemplary embodiment comprises a trunk-side detection/branching means 21, a branch-side detection means 31, an insertion signal adjustment means 41, a trunk signal adjustment means 51 and a combining/output means 61.

The trunk-side detection/branching means 21 detects a failure of a trunk-side optical signal inputted from the trunk side and outputs it as a first detection result, and splits the trunk-side optical signal and outputs the split signals respectively to the trunk side and to the branch side.

The branch-side detection means 31 detects a failure of a branch-side optical signal inserted from the branch side and outputs it as a second detection result, and sends the branch-side optical signal as an insertion signal.

The insertion signal adjustment means 41 outputs the insertion signal whose pass-through degree has been adjusted on the basis of the first detection result, as a first adjusted signal.

The trunk signal adjustment means 51 outputs the trunk-side optical signal whose pass-through degree has been adjusted on the basis of the second detection result, as a second adjusted signal.

The combining/output means 61 outputs, to the outside, an optical signal into which the first adjusted signal and the second adjusted signal are combined together, as a trunk-side output optical signal.

When the second detection result indicates no failure occurrence of the branch-side optical signal, the trunk-signal adjustment means 51 passes only a signal component of a first specific wavelength out of the trunk-side optical signal. On the other hand, when the second detection result indicates any failure occurrence of the branch-side optical signal, the trunk-signal adjustment means 51 passes a signal component of a second specific wavelength, as well as that of the first specific wavelength, out of the trunk-side optical signal.

When the first detection result indicate no failure occurrence of the trunk-side optical signal, the insertion signal adjustment means 41 passes only a signal component of the second wavelength out of the insertion signal. On the other hand, when the first detection result indicates any failure occurrence of the trunk-side optical signal, the insertion signal adjustment means 41 passes a signal component of the first specific wavelength, as well as that of the second specific wavelength, out of the insertion signal.

(Specific Configuration)

Next, a specific configuration of the optical branching/insertion device 71 will be described, with reference to FIG. 2.

The trunk-side detection/branching means 21 comprises an optical coupler 21A, an optical coupler 21B and an optical input interruption detection circuit (optical input interruption detection unit) 21C.

The optical coupler 21A splits a trunk-side optical signal and sends the split signals, respectively, into the direction where branching/passing is to be performed and into the direction where detection of an input failure (in the present exemplary embodiment, an "interruption of an input optical signal" is taken as an example) is to be performed (the direction of the optical input interruption detection circuit 21C).

The optical coupler 21B splits the trunk-side optical signal having passed through the optical coupler 21A and sends the split signals, respectively, into the direction for branching (to the branch side) and into the direction for pass-through.

The optical input interruption detection circuit (optical input interruption detection unit) 21C monitors the input power of the trunk-side optical signal, and thereby performs determination of whether or not any input interruption has been detected on the trunk-side propagation path. On detecting any input interruption, the optical input interruption detection circuit 21C sends "trunk-side input interruption information" (the first detection result) to the insertion signal adjustment means 41.

The branch-side detection means 31 comprises an optical coupler 31A and an optical input interruption detection circuit (optical input interruption detection unit) 31B.

The optical coupler 31A splits a branch-side optical signal and sends the split signals, respectively, into the direction where insertion is to be performed and into the direction where detection of an optical input interruption is to be performed (the direction of the optical input interruption detection circuit 31B).

The optical input interruption detection circuit 31B monitors the input power of the branch-side optical signal, and thereby performs determination of whether or not any input interruption has been detected on the branch-side propagation path. On detecting any input interruption, the optical input interruption detection circuit 31B sends "branch-side input interruption information" (the second detection result) to the trunk signal adjustment means 51.

The insertion signal adjustment means 41 comprises an optical filter 41A, an optical switch 41B, an optical filter 41C and an optical switch control circuit (optical switch control unit) 41D.

The optical filter 41A receives input of a branch-side optical signal (insertion signal) from the optical coupler 31A at a port 7, and then outputs a specific optical signal component (insertion light: a signal component having the second specific wave length) at a port 8 and the other optical signal component (insertion-prevented light: a signal component having the first specific wavelength) at a port 9.

The optical switch 41B performs passing/interception of the insertion-prevented light from the optical filter 41A.

The optical filter 41C is an optical filter with the same configuration as that of the optical filter 41A, and is arranged in the reverse direction to that of the optical filter 41A.

On receiving the trunk-side input interruption information, which is sent from the optical input interruption detection circuit 21C when any input interruption has been detected, the optical switch control circuit 41D sets the optical switch 41B to the ON state.

The insertion light described above is outputted to the outside of the insertion signal adjustment means 41 via the ports 7 and 8 of the optical filter 41A and ports 10 and 12 of the optical filter 41C.

When the optical switch 41B is in the ON state, the insertion-prevented light described above is outputted to the outside of the insertion signal adjustment means 41 via the ports 7 and 9 of the optical filter 41A and ports 11 and 12 of the optical filter 41C. On the other hand, when the optical switch 41B is in the OFF state, the insertion-prevented light described above is intercepted by the optical switch 41B, and accordingly is not outputted to the outside of the insertion signal adjustment means 41.

The optical switch control circuit 41D sends to the optical switch 41B a power control signal relevant to passing/interception of an optical signal.

The optical input interruption detection circuit 21C notifies the optical switch control circuit 41D of the trunk-side input interruption information only when any input interruption has been detected. In other words, when no input interruption has been detected, the optical input interruption detection circuit 21C notifies the optical switch control circuit 41D of nothing. Accordingly, if no input interruption occurs, the optical switch 41B is kept in the OFF state.

The trunk signal adjustment means 51 comprises an optical filter 51A, an optical switch 51B, an optical filter 51C and an optical switch control circuit (optical switch control unit) 51D.

The optical filter 51A receives input of a trunk-side optical signal from the optical coupler 21B at a port 1, and then outputs a specific optical signal component (pass-through light: a signal component having the first specific wavelength) to a port 2 and the other optical signal component (pass-through-prevented light: a signal component having the second specific wavelength) to a port 3.

The optical switch 51B performs passing/interception of the pass-through-prevented light from the optical filter 51.

The optical filter 51C is an optical filter with the same configuration as that of the optical filter 51A, and is arranged in the reverse direction to that of the optical filter 51A.

On receiving the branch-side input interruption information, which is sent from the optical input interruption detection circuit 31B when any input interruption has been detected, the optical switch control circuit 51D sets the optical switch 51B to the ON state.

The pass-through light described above is outputted to the outside of the trunk signal adjustment means 51 via the ports 1 and 2 of the optical filter 51A, and ports 4 and 6 of the optical filter 51C.

When the optical switch 51B is in the ON state, the pass-through-prevented light described above is outputted to the outside of the trunk signal adjustment means 51 via the ports 1 and 3 of the optical filter 51A, and ports 5 and 6 of the optical filter 51C, and on the other hand, when the optical switch 51B is in the OFF state, the pass-through-prevented light is intercepted by the optical switch 51B, and accordingly is not outputted to the outside of the trunk signal adjustment means 51.

The optical switch control circuit 51D sends to the optical switch 51B a power control signal relevant to passing/interception of an optical signal.

The optical input interruption detection circuit 31B notifies the optical switch control circuit 51D of the branch-side input interruption information only when any input interruption has been detected. In other words, when no input interruption has been detected, the optical input interruption detection circuit 31B notifies the optical switch control circuit 51D of nothing. Accordingly, if no input interruption occurs, the optical switch 51B is kept in the OFF state.

The combining/output means 61 comprises an optical coupler 61A which receives input of an optical signal having passed through the optical filter 51C and that having passed through the optical filter 41C, and then combines the signals together and outputs the combined signal.

That is, the optical filter 51C combines pass-through light inputted from the port 4 with pass-through-prevented light inputted as necessary from the port 5 (the pass-through-prevented light is passed only when the optical switch 51B is in the ON state), and outputs the combined light to the optical coupler 61A.

On the other hand, the optical filter 41C combines insertion light inputted from the port 10 with insertion-prevented light inputted as necessary from the port 11 (the insertion-prevented light is passed only when the optical switch 41B is in the ON state), and outputs the combined light to the optical coupler 61A.

In the first exemplary embodiment, optical couplers which are devices for performing coupling or branching on a plurality of optical fibers are employed as components of the optical branching/insertion device 71, as has been described above. That is, the optical coupler 21A performs a function to branch a trunk-side optical signal and output the branch signal to the branch side. The optical coupler 61A performs a function to combine a pass-through signal component out of a trunk-side optical signal with an insertion signal component out of a branch-side optical signal and output the combined signal.

The optical switch control circuit 41D controls the optical switch 41B on the basis of a result of input interruption detection by the optical input interruption detection circuit 21C. Accordingly, because the pass-through degree with respect to an optical signal on the trunk side is adjusted, even when any input interruption has occurred on the trunk side, insertion light corresponding to the remaining signal is effectively propagated.

Similarly, the optical switch control circuit 51D controls the optical switch 51B on the basis of a result of input interruption detection by the optical input interruption detection circuit 31B. Accordingly, because the pass-through degree with respect to an optical signal on the trunk side is adjusted, even when any input interruption occurs on the branch side, pass-through light corresponding to the remaining signal is effectively propagated.

(Network Configuration)

Figure 3:
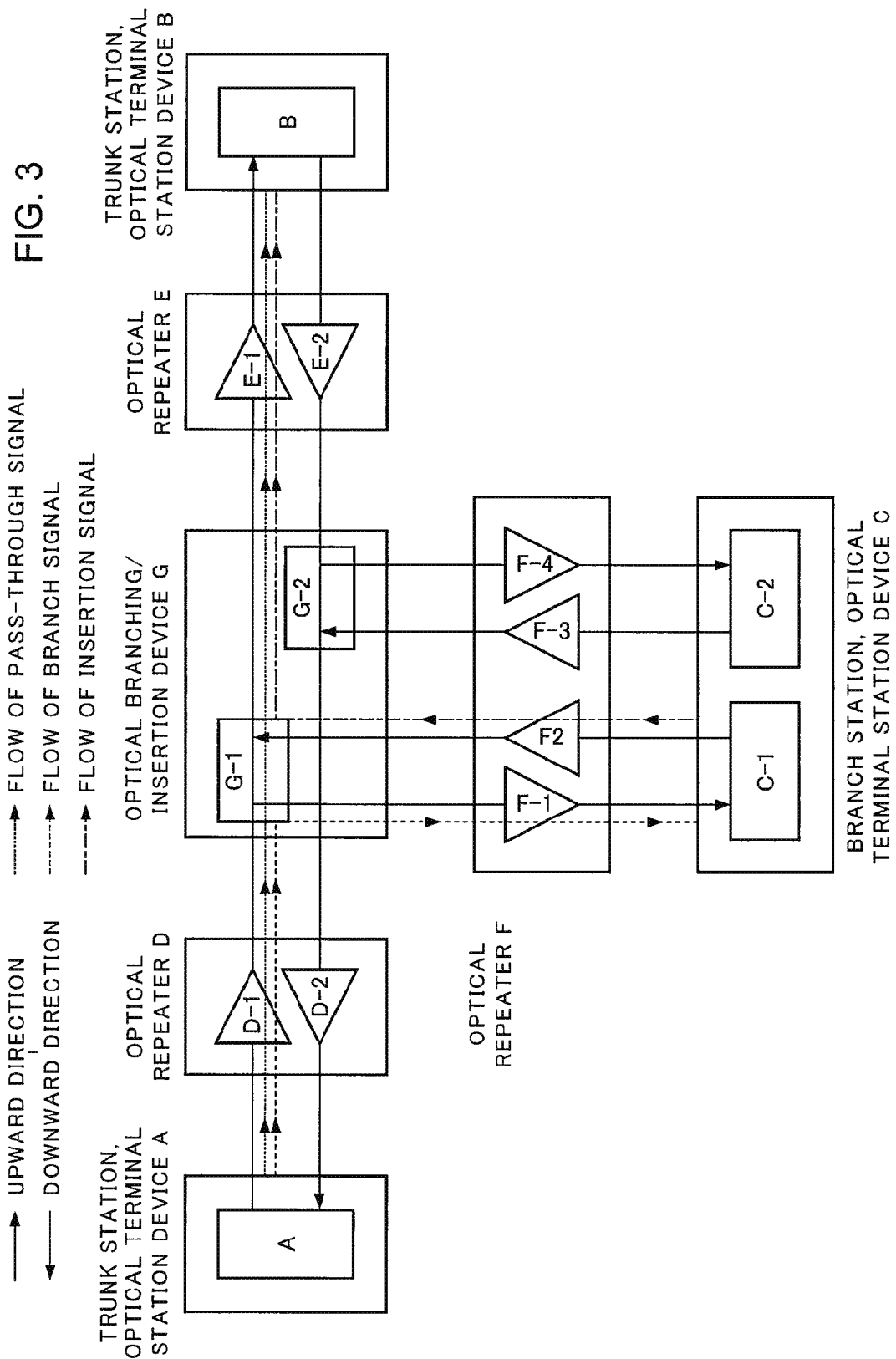
FIG. 3 A block diagram showing an example of a network configuration of the optical branching/insertion device shown in FIGS. 1 and 2

FIG. 3 is a diagram showing a network configuration including the optical branching/insertion device 71 according to the first exemplary embodiment, where upward and downward directions are expediently defined.

The configurations of G-1 and G-2, which are arranged respectively in the upward and downward directions and collectively as an optical branching/insertion device G, are the same as that of the optical branching/insertion device 71 described above. That is, FIGS. 1 and 2 correspond to diagrams showing the contents of the configuration of the optical branching/insertion device G-1. Accordingly, the present description will be continued in particular with respect to the upward direction in FIG. 3, and a description of the downward direction having the same configuration will be omitted.

The network comprises optical terminal station devices A and B as trunk stations, optical repeaters D, E and F each consisting of an optical amplifier or the like, an optical terminal station device C as a branch station, and the optical branching/insertion device G.

As mentioned above, the optical branching/insertion device G comprises G-1 and G-2, each having the same configuration as that of the optical branching/insertion device 71, respectively in the upward and downward directions. The optical terminal station device C comprises C-1 as a branch station operating with the optical branching/insertion device G-1 and C-2 as a branch station operating with the optical branching/insertion device G-2.

The optical repeaters D and E comprise D-1 and D-2, and E-1 and E-2, respectively, in respective ones of the upward and downward directions.

The optical repeater F comprises F-1 for relaying a branch signal from the optical branching/insertion device G-1, F-2 for relaying an insertion signal from the optical terminal station device C-1, F-4 for relaying a branch signal from the optical branching/insertion device G-2 and F-3 for relaying an insertion signal from the optical terminal station device C-2.

Wavelength-multiplexed light outputted from the optical terminal station device A passes through the optical repeater D-1 and then is inputted to the optical branching/insertion device G-1. In G-1, the wavelength-multiplexed light is split to the trunk side and the branch side. On the trunk side, a signal component of a specific wavelength (pass-through light) is passed out of the wavelength-multiplexed light. Also in the optical branching/insertion device G-1, the pass-through signal (pass-through light) on the trunk side is combined with an insertion signal (insertion light) from the branch side. The combined signal is propagated to the opposing optical terminal station device B via the optical repeater E-1.

(Flow of Optical Signals)

Next, on the basis of the above-described network configuration, flows of optical signals in the optical branching/insertion device (submarine optical branching/insertion device) G-1 will be described, with reference to FIGS. 4 and 5. Here, FIGS. 1 and 2 are referred to in terms of constituent members of the optical branching/insertion device G-1 (Optical branching/insertion device 71).

Here, a flow of optical signals in the normal state will be described first, with reference to FIG. 4.

Figure 4:
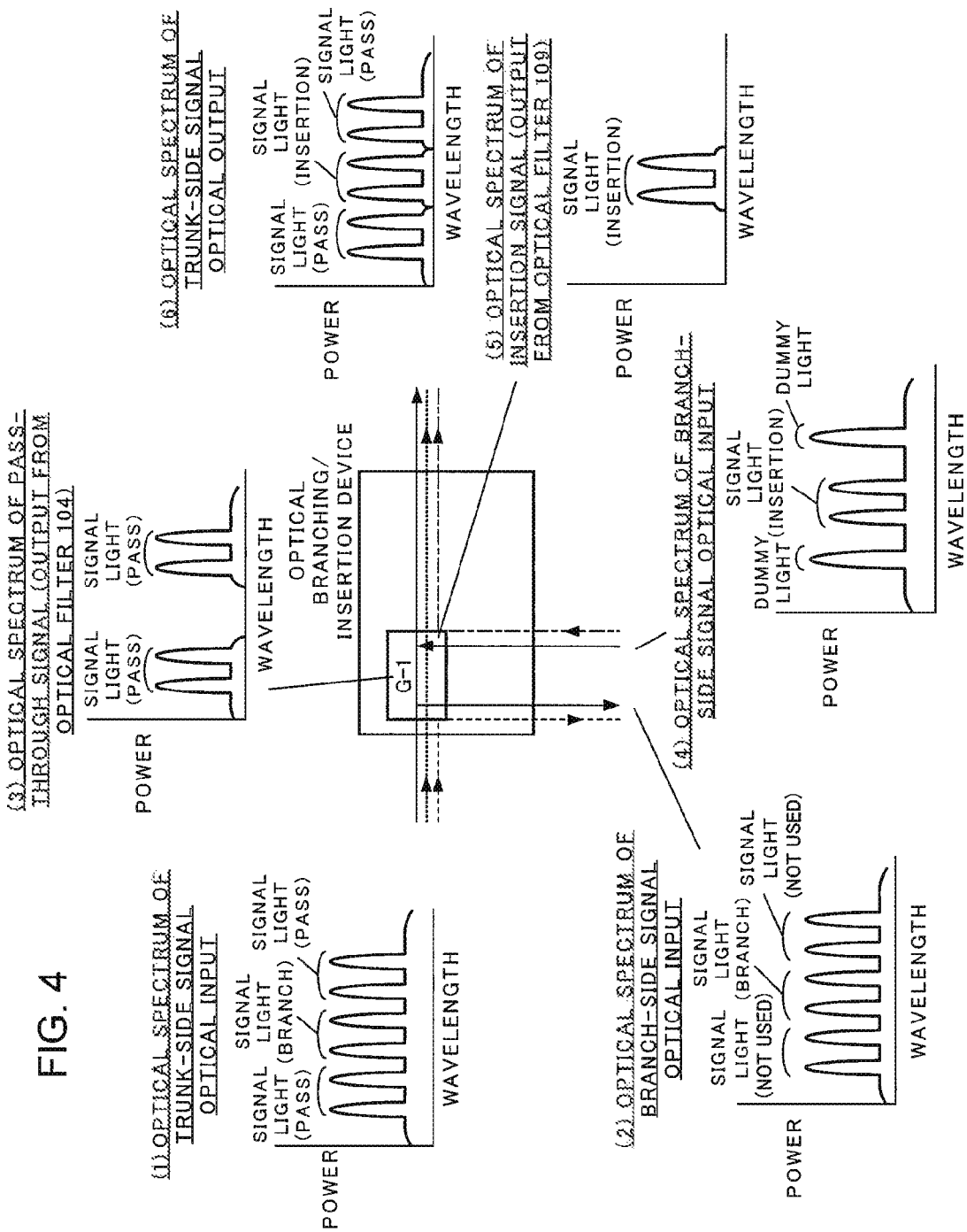
FIG. 4 A diagram schematically showing flows of optical signals in a normal state, in the optical branching/insertion device shown in FIGS. 1 and 2

In the first exemplary embodiment, a trunk-side optical signal including optical signal components of two wavelengths to branch out (branch light) and optical signal components of four wavelengths to pass through (pass-through light), as shown by (1) in FIG. 4, is inputted to the trunk-side detection/branching means 21 of the optical branching/insertion device G-1.

The trunk-side detection/branching means 21 having received the trunk-side optical signal firstly outputs the branch light to the branch side, as shown by (2) in FIG. 4, by means of the optical coupler 21B. Although the trunk-side detection/branching means 21 performs no filtering, and accordingly also the optical signal components to pass through (pass-through light) branches out, the signal components are not terminated at the opposing optical terminal station device C and accordingly cause no problem.

Next, as shown by (3) in FIG. 4, the trunk signal adjustment means 51 of the optical branching/insertion device G-1 causes necessary signal components (pass-through light) to pass through it via the optical filters 51A and 51C, and intercepts unnecessary signal components (here, the branch light) by means of the optical switch 51B in the OFF state.

Subsequently, a branch-side optical signal including optical signal components of two wavelengths to insert (insertion light) and dummy light for power compensation of two wavelengths consisting of a shorter wavelength side signal component and a longer wavelength side one, as shown by (4) in FIG. 4, is inputted to the branch-side detection means 31 of the optical branching/insertion device G-1.

Next, the insertion signal adjustment means 41 of the submarine optical branching/insertion device G-1 causes necessary signal components (insertion light) to pass through it via the optical filters 41A and 41C, and intercepts unnecessary signal components (here, the dummy light), as shown by (5) in FIG. 4, by means of the optical switch 41B in the OFF state. That is, the dummy light, which is unnecessary in the normal state, is intercepted here.

Finally, as shown by (6) in FIG. 4, the optical signal components on the pass-through signal side (pass-through light) and those on the insertion signal side (insertion light) are combined together and then outputted, by the optical coupler 61A as the combining/output means 62. That is, an optical signal having a predetermined power is outputted from the optical branching/insertion device G-1 to the outside.

Next, a flow of optical signals in a failure state (in a case of a forward failure of the optical repeater D-1) will be described, with reference to FIG. 5.

Figure 5:
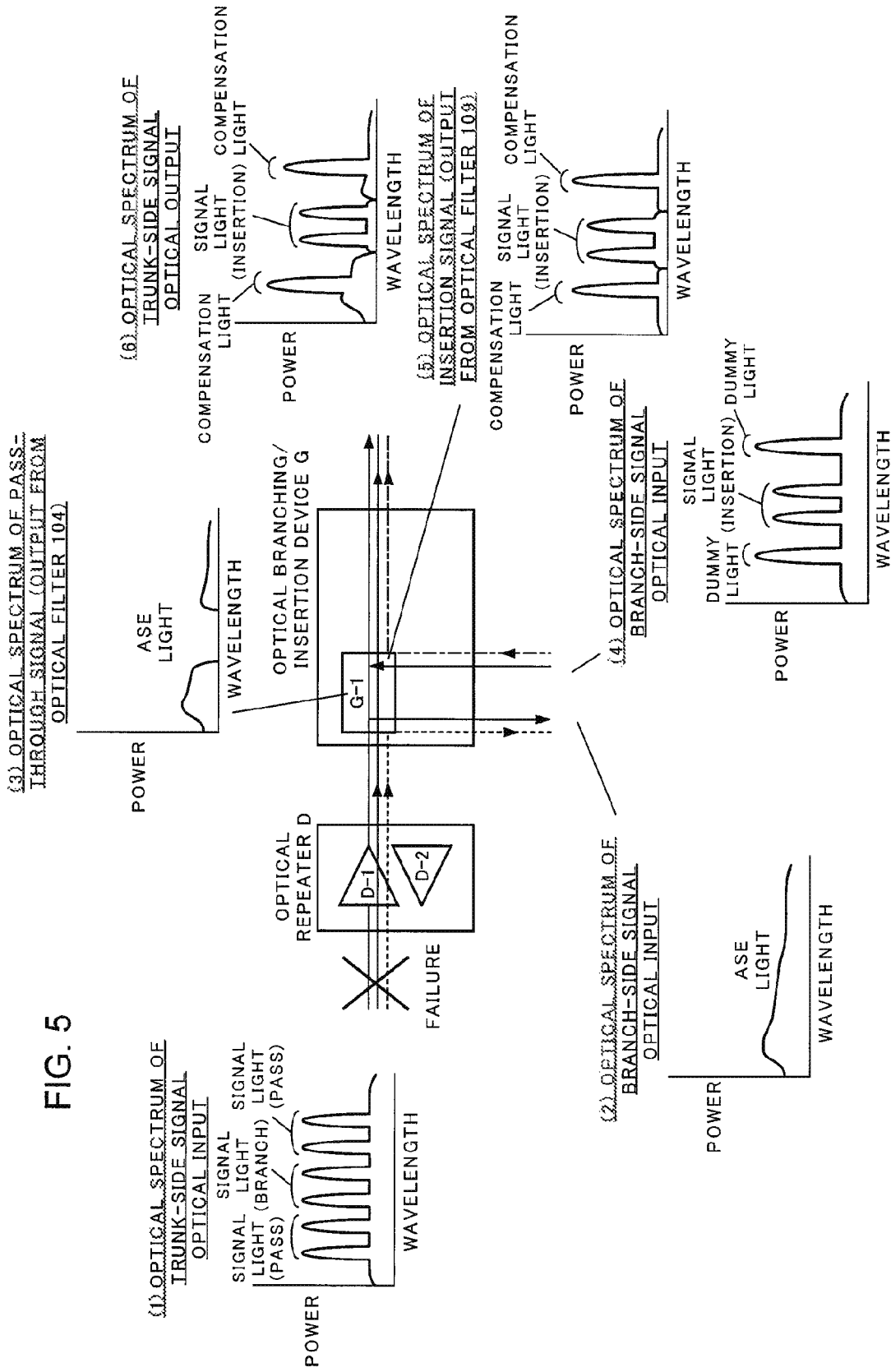
FIG. 5 A diagram schematically showing flows of optical signals in a state where a failure has occurred, in the optical branching/insertion device shown in FIGS. 1 and 2

As shown by (1) in FIG. 5, a trunk-side optical signal is, similarly to that in the normal state, an optical signal including optical signal components to branch out (branch light) consisting of two wavelength components and optical signal components to pass through (pass-through light) consisting of four wavelength components. That is, the trunk-side optical signal including the optical signals of two wavelengths to branch out (branch light) and the optical signals of four wavelength to pass through (pass-through light) is propagated up to a point just before a point of failure occurrence preceding the optical repeater (submarine optical repeater) D-1. However, in the presently assumed situation, a cable failure has occurred before the optical repeater D-1, and therefore, the optical repeater D-1 outputs spontaneous emission light to the subsequent device.

Accordingly, the spontaneous emission light having lost the signal components owing to the cable failure is inputted to the trunk-side detection/branching means 21 of the optical branching/insertion device G-1, and therefore, a branch signal outputted to the branch side by the optical coupler 21B becomes equal to the spontaneous emission light having lost the signal components, as shown by (2) in FIG. 5.

Next, the trunk signal adjustment means 51 of the optical branching/insertion device G-1 outputs, instead of the optical signal components to pass through in the normal state (refer to FIG. 4 (3)), spontaneous emission light extracted into a filtered shape by the optical filters 51A and 51C, as shown by (3) in FIG. 5.

Subsequently, a branch-side optical signal including optical signal components to insert (insertion light) consisting of two wavelength components and dummy light for power compensation of two wavelengths consisting of a shorter wavelength side signal component and a longer wavelength side one, as shown by (4) in FIG. 5, is inputted to the branch-side detection means 31 of the optical branching/insertion device G-1.

Next, the insertion signal adjustment means 42 of the optical branching/insertion device G-1 causes necessary signal components (insertion light) to pass through it via the optical filters 41A and 41C, and also causes the optical signal components having been intercepted (in this case, the dummy light) to pass through it, as compensation light for power compensation, via the optical switch 41B having been set to the ON state by the optical switch control circuit 41D, as shown by (5) in FIG. 5.

Finally, the spontaneous emission light on the pass-through side is combined with the optical signal components and compensation light on the insertion side by the optical coupler 61A as the combining/output means 61, as shown by (6) in FIG. 5. That is, although signal components other than the ones thus inserted have been lost, the power of the spontaneous emission light is supplemented by the compensation light. Accordingly, an optical signal having a predetermined significant power is outputted from the optical branching/insertion device G-1 to the outside.

(Description of Operation)

Next, operation of the optical branching/insertion device 71 shown in FIGS. 1 and 2 will be described, with reference to a flow chart shown in FIG. 6.

[Operation Based on Trunk-Side Optical Signal]

Figure 6:
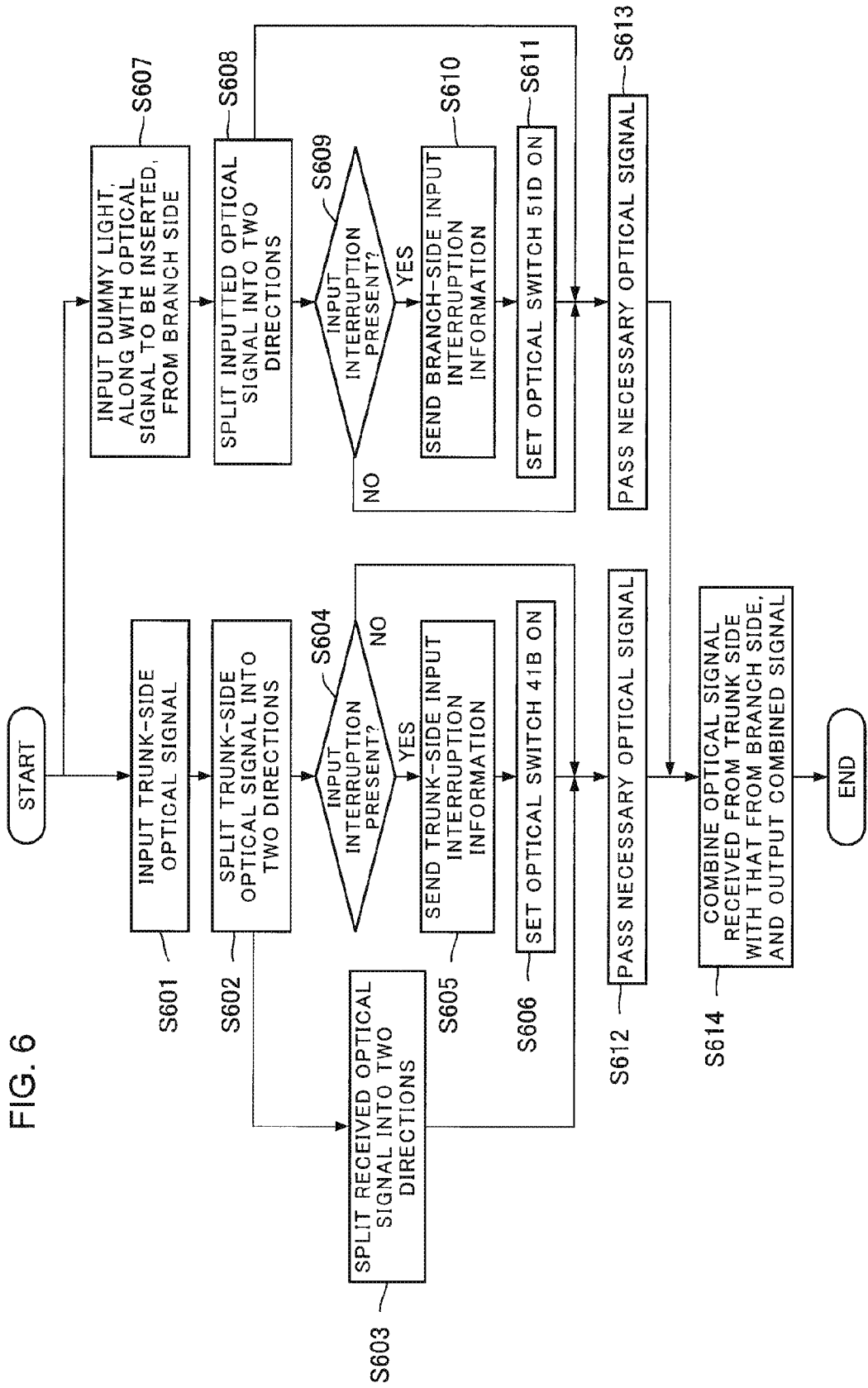
FIG. 6 A flow chart showing an example of operation of the optical branching/insertion device shown in FIGS. 1 and 2

First, the optical coupler 21A receives input of a trunk-side optical signal from the outside (FIG. 6: S601). The optical coupler 21A splits the trunk-side optical signal into two directions, one of which is on the side of the optical coupler 21B and the other is on the side of the optical input interruption detection circuit 21C (FIG. 6: S602).

The optical coupler 21B splits the optical signal received from the optical coupler 21A into two directions, one of which is on the side of the optical filter 51A and the other is on the branch side (FIG. 6: S603).

On the basis of the optical signal received from the optical coupler 21A, the optical input interruption detection circuit 21C determines whether or not any input interruption has occurred on the trunk side propagation path (FIG. 6: S604).

If any input interruption has occurred (FIG. 6: YES at S604), the optical input interruption detection circuit 21C sends trunk-side input interruption information to the optical switch control circuit 41D (FIG. 6: S605).

The optical switch control circuit 41D having received the trunk-side input interruption information sets the optical switch 41B to the ON state (FIG. 6: S606).

On the other hand, if no input interruption has occurred (FIG. 6: NO at S604), the optical switch 41B is kept in the OFF state.

[Operation Based on Branch-Side Optical Signal]

From the branch side, an optical signal to insert is inputted, along with dummy light, to the optical coupler 31A (FIG. 6: S607). The optical coupler 31A splits the inputted optical signal into two directions, one of which is on the side of the optical filter 41A and the other is on the side of the optical input interruption detection circuit 31B (FIG. 6: S608).

On the basis of the optical signal received from the optical coupler 31A, the optical input interruption detection circuit 31B determines whether or not any input interruption has occurred on the branch side propagation path (FIG. 6: S609).

If any input interruption has occurred (FIG. 6: YES at S609), the optical input interruption detection circuit 31B sends branch-side input interruption information to the optical switch control circuit 51D (FIG. 6: S610).

The optical switch control circuit 51D having received the branch-side input interruption information sets the optical switch 51B to the ON state (FIG. 6: S611).

On the other hand, if no input interruption has occurred (FIG. 6: NO at S609), the optical switch 51B is kept in the OFF state.

[Optical Signal Passing Process Based on Adjusted Pass-Through Degree]

The optical filter 51A sends the optical signal received from the optical coupler 21B (FIG. 6: S603 and S609 to S611) to the optical filter 51C (FIG. 6: S612).

Specifically, when any input interruption has been detected by the optical input interruption detection circuit 31B (FIG. 6: YES at S609), the optical switch control circuit 51D sets the optical switch 51B to the ON state. Accordingly, to the optical filter 51C, the pass-through-prevented light for supplementing the branch-side optical signal is sent via the optical switch 51B, as well as the pass-through light.

On the other hand, when no input interruption has been detected by the optical input interruption detection circuit 31B (FIG. 6: NO at S609), the optical switch 51B is kept in the OFF state. Accordingly, only the pass-through light is sent to the optical filter 51C.

Similarly, the optical filter 41A sends the optical signal received from the optical coupler 31A (FIG. 6: S608 and S604 to S606) to the optical filter 41C (FIG. 6: S613).

Specifically, when any input interruption has been detected by the optical input interruption detection circuit 21C (FIG. 6: YES at S604), the optical switch control circuit 41D sets the optical switch 51B to the ON state. Accordingly, to the optical filter 41C, the insertion-prevented light for supplementing the trunk-side optical signal (compensation light) is sent via the optical switch 41B, as well as the insertion light (FIG. 6: S613).

On the one hand, when no input interruption has been detected by the optical input interruption detection circuit 21C (FIG. 6: NO at S604), the optical switch 41B is kept in the OFF state. Accordingly, only the insertion light is sent to the optical filter 41C (FIG. 6: S613).

The optical coupler 61A combines the optical signals received respectively from the optical filters 51C and 41C, and then sends the combined signal to the outside (FIG. 6: S614).

Although the above description of operation has been made, for convenience, in numerical order according to the numbers assigned in FIG. 6 (S601 to S614), contents of operation of the optical branching/insertion device 71 according to the first exemplary embodiment is not limited to that order.

Further, the configuration may be such that the contents to be performed in the respective processes corresponding to the steps S601 to S614 (FIG. 6) described above are programmed, and the series of control programs are realized by a computer (including, for example, a logic device, a CPU (Central Processing Unit) and the like).

The above-described programs are delivered, for example, by being stored in a computer readable non-transitory recording medium such as a flexible disk, a CD-ROM (Compact Disk Read-Only Memory) and an MO (Magneto-Optical disk), or via a network.

Effect of First Exemplary Embodiment

In the optical branching/insertion device 71 according to the first exemplary embodiment, branching and passing of a trunk-side optical signal and insertion of a branch-side optical signal are performed by the optical couplers 21B and 61A, the optical filters 41A, 41C, 51A and 51C and the like. It accordingly can perform an OADM (Optical Add/Drop Multiplexer) function in a submarine cable system.

Further, when an input failure of a trunk-side optical signal is detected, the state of the optical switch 41B is changed from OFF to ON. Accordingly, an optical signal component, out of a branch-side optical signal, which have been intercepted (insertion-prevented light) comes to be outputted as compensation light for the optical signal (pass-through light) having been lost. As a result, variation in the insertion signal power caused by an input failure is suppressed.

Further, when an input failure of a branch-side optical signal is detected, the state of the optical switch 51B is changed from OFF to ON. Accordingly, an optical signal component, out of a trunk-side optical signal, which have been intercepted (pass-through-prevented light) comes to be outputted as compensation light for the optical signal (insertion light) having been lost. As a result, variation in the pass-through signal power caused by an input failure is suppressed.

Specifically, in the optical branching/insertion device 71, the optical switch control circuit 41D for controlling the optical switch 41B operates on the basis of a detection result by the optical input interruption detection circuit 21C for detecting an optical input interruption of a trunk-side optical signal. The optical switch control circuit 51D for controlling the optical switch 51B operates on the basis of a detection result by the optical input interruption detection circuit 31B for detecting an optical input interruption of a branch-side optical signal.

By these operations, an initial level of the total power of an optical signal is maintained. As a result, variation in the power of a remaining optical signal caused by an input failure is suppressed.

Second Exemplary Embodiment

Figure 7:
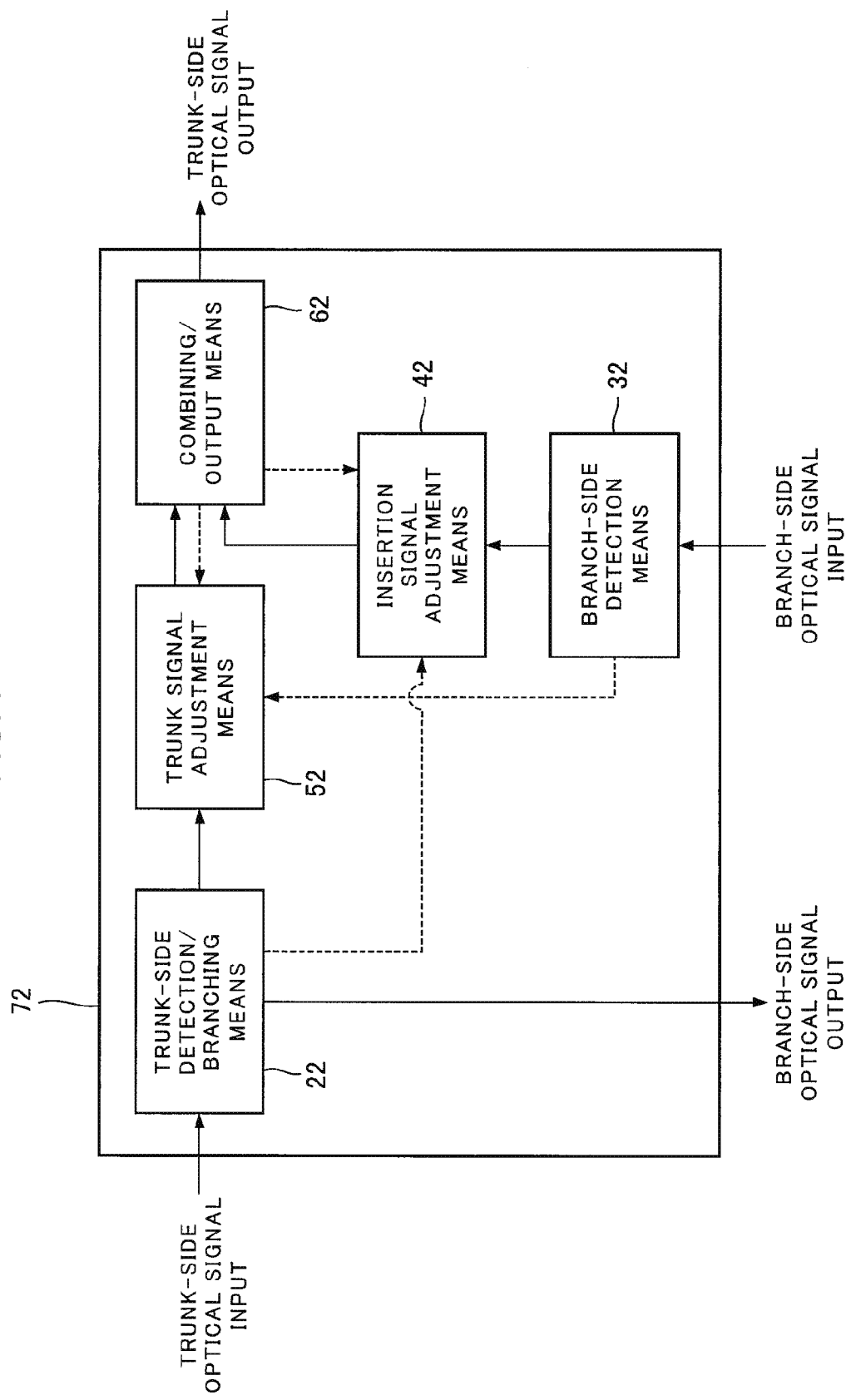
FIG. 7 A block diagram showing an example of a basic configuration of an optical branching/insertion device according to a second exemplary embodiment of the present invention FIG. 8 A block diagram showing an example of a specific configuration of the optical branching/insertion device shown in FIG. 7

An optical branching/insertion device according to a second exemplary embodiment of the present invention will be described, with reference to FIGS. 7 and 8.

The present optical branching/insertion device is the one achieved based on the basic configuration of the optical branching/insertion device 71 described above, and it has a characteristic feature in the content of its configuration relating to control to keep constant the output power of a trunk-side optical signal both in the normal state and in a case of a cable failure. Here, to a constituent member which is the same as that in the first exemplary embodiment described above, the same sign as that in the first exemplary embodiment will be assigned.

(Basic Configuration)

The optical branching/insertion device 72 according to the second exemplary embodiment comprises a trunk-side detection/branching means 22, a branch-side detection means 32, an insertion signal adjustment means 42, a trunk signal adjustment means 52 and a combining/output means 62.

The trunk-side detection/branching means 22 detects a failure of an optical signal inputted from the trunk side (a trunk-side optical signal), and splits the inputted signal and outputs the split signals respectively to the trunk side and to the branch side.

The branch-side detection means 32 detects a failure of a signal inserted from the branch side (an insertion signal) and sends the insertion signal.

On the basis of the detection result by the trunk-side detection/branching means 22, the insertion signal adjustment means 42 adjusts a pass-through degree with respect to the insertion signal received from the branch-side detection means 32.

On the basis of the detection result by the branch-side detection means 32, the trunk-signal adjustment means 52 adjusts a pass-through degree with respect to the trunk-side optical signal received from the trunk-side detection/branching means 22.

The combining/output means 62 receives signals adjusted respectively by the insertion signal adjustment means 42 and by the trunk signal adjustment means 52, and combines them together and then outputs the combined signal to the outside.

The combining/output means 62 further has a function (output-monitoring/sending unit) to monitor the power of the optical signal which is outputted to the outside and to send a power control signal based on the monitoring to the insertion signal adjustment means 42 and the trunk signal adjustment means 52.

On the basis of the power control signal, the insertion signal adjustment means 42 and the trunk signal adjustment means 52 perform the adjustments described above.

More specifically, the insertion signal adjustment means 42 performs the adjustment based on the power control signal only when a failure has been detected by the trunk-side detection/branching means 22. The trunk-signal adjustment means 52 performs the adjustment based on the power control signal only when a failure has been detected by the branch-side detection means 32.

Further, when no failure has been detected by the trunk-side detection/branching means 22, the insertion signal adjustment means 42 intercepts a signal component having a first specific wavelength out of the insertion signal. When no failure has been detected by the branch-side detection means 32, the trunk signal adjustment means 52 intercepts a signal component having a second specific wavelength out of the trunk-side optical signal.

(Specific Configuration)

Here, a description will be given of, among constituent members of the optical branching/insertion device 72, ones which are different from the constituent members of the optical branching/insertion device 71 according to the first exemplary embodiment described above, and the like, with reference to FIG. 8.

In the second exemplary embodiment, the optical switches used in the first exemplary embodiment to perform interception or passing of specific optical signals are each replaced by an optical attenuator (ATT) which attenuates an optical signal to an appropriate signal level.

Figure 2:
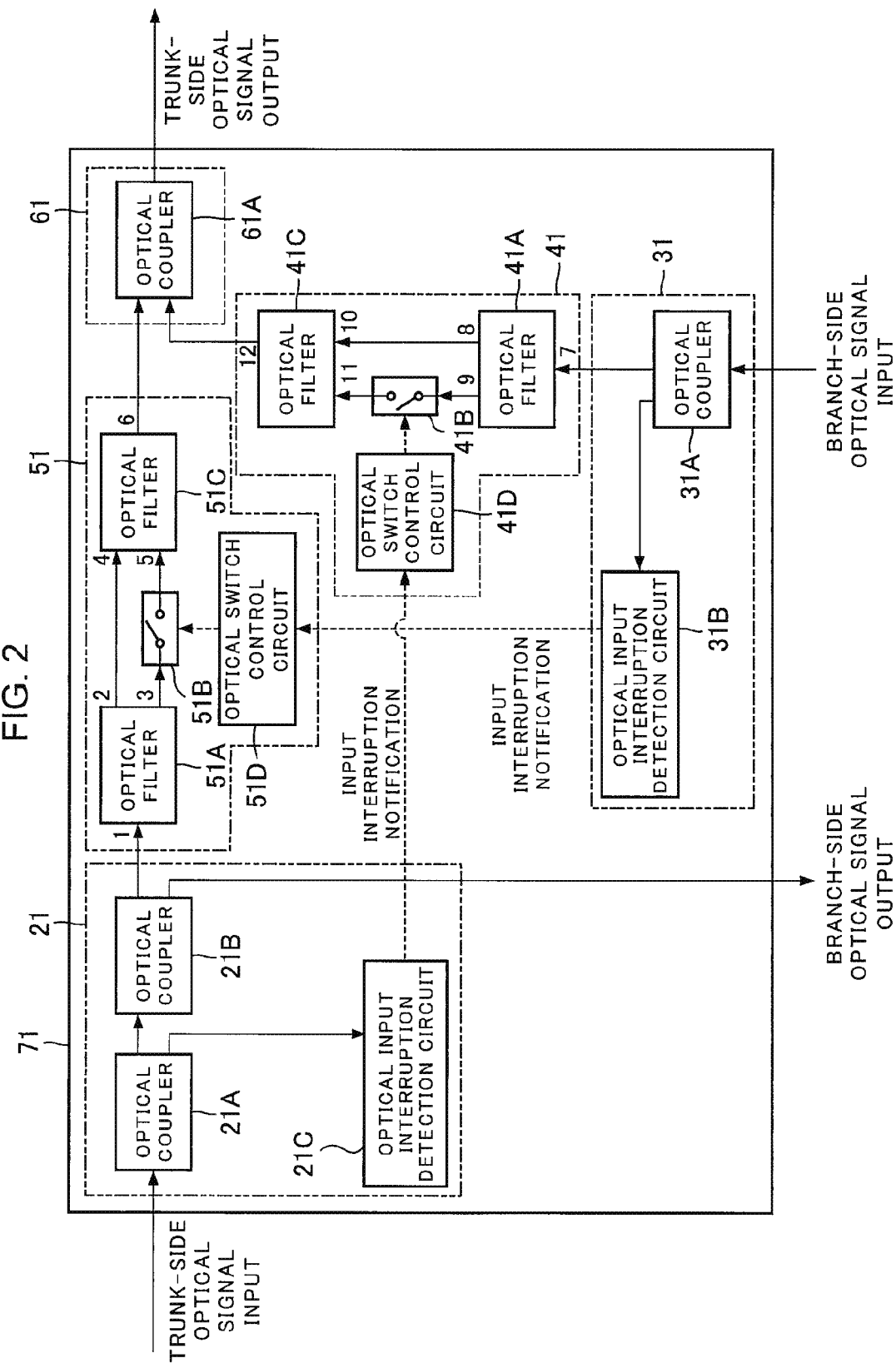
Figure 8:
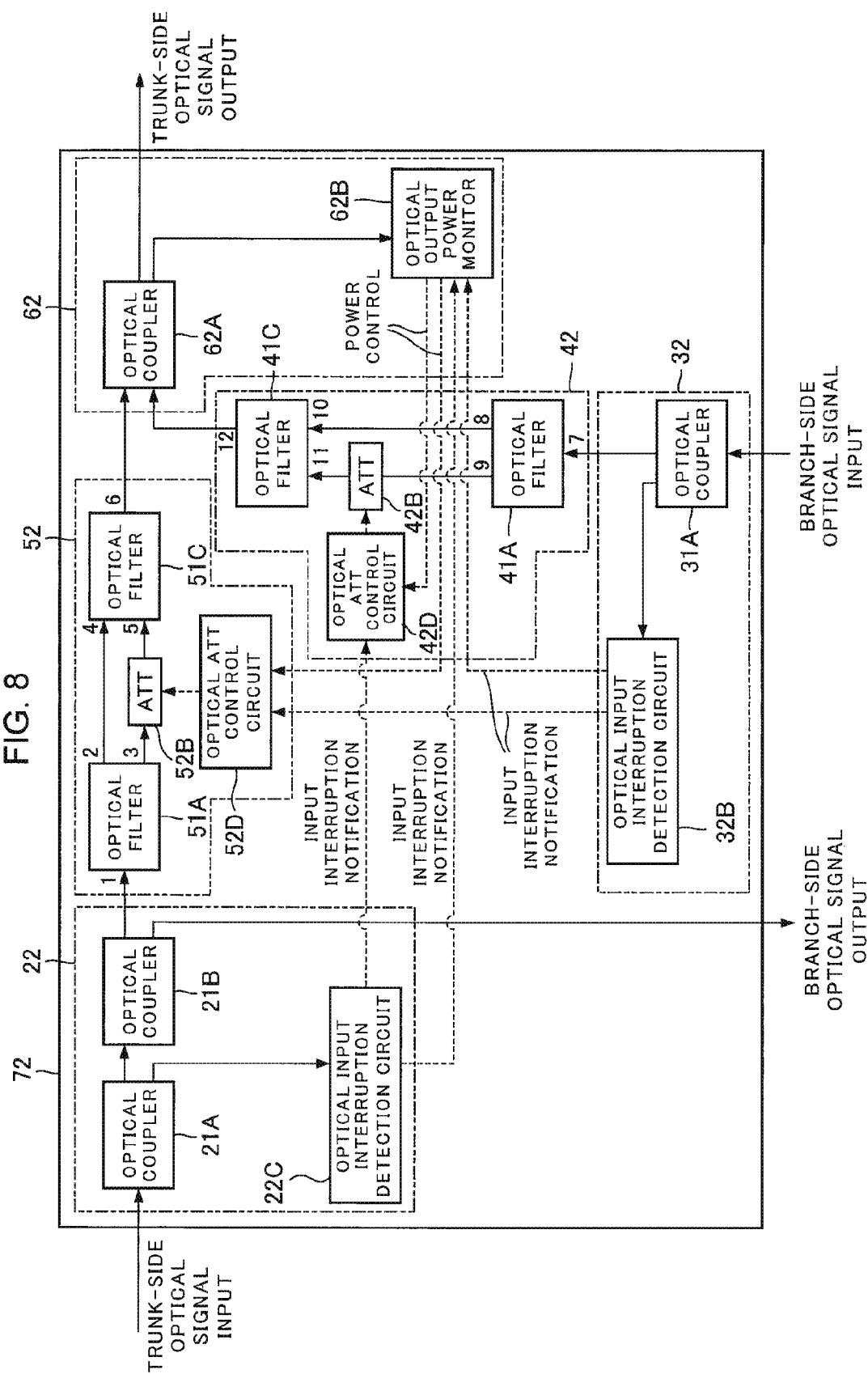

Specifically, the optical switch 51B in FIG. 2 is replaced, in FIG. 8, by an optical attenuator (ATT) 52B which performs passing/interception of pass-through-prevented light from the optical filter 51A. The optical switch 41B in FIG. 2 is replaced by an optical attenuator (ATT) 42B which performs passing/interception of insertion-prevented light from the optical filter 41A.

Further, the optical switch control circuit 41D in FIG. 2 is replaced, in FIG. 8, by an optical ATT control circuit (optical ATT control unit) 42D which controls the insertion loss of the optical attenuator 42B. The optical switch control circuit 51D in FIG. 2 is replaced, in FIG. 8, by an optical ATT control circuit (optical ATT control unit) 52D which controls the insertion loss of the optical attenuator 52B.

When its insertion loss is small, the optical attenuator 52B outputs pass-through-prevented light to the optical filter 51C. When its insertion loss is small, the optical attenuator 42B outputs insertion-prevented light to the optical filter 41C.

The optical branching/insertion device 72 further comprises an optical output power monitor (output-monitoring/sending unit) 62B and an optical coupler 62A.

The optical output power monitor 62B monitors the optical power of trunk-side optical signal output and sends, as necessary, a power control signal (monitoring signal) based on the monitoring to the optical ATT control circuit 42D and the optical ATT control circuit 52D.

The optical coupler 62A combines an optical signal having passed through the optical filter 51C with an optical signal having passed through the optical filter 41C, and then splits the combined signal into the direction for output and the direction of the optical output power monitor 62B.

The optical input interruption detection circuit (optical input interruption detection unit) 22C monitors the input power of a trunk-side optical signal and thereby determines whether or not any input interruption has occurred. If detecting any input interruption, the optical input interruption detection circuit 22C sends "trunk-side input interruption information" to the optical ATT control circuit 42D and the optical output power monitor 62B.

The optical input interruption detection circuit (optical input interruption detection unit) 32B monitors the input power of a branch-side optical signal and thereby determines whether or not any input interruption has occurred. If detecting any input interruption, the optical input interruption detection circuit 32B sends "branch-side input interruption information" to the optical ATT control circuit 52D and the optical output power monitor 62B.

If not receiving the trunk-side input interruption information from the optical input interruption detection circuit 22C, the optical ATT control circuit 42D gives priority to interception of an optical signal by setting the insertion loss of the optical attenuator 42B at the maximum value, and does not perform the control based on a power control signal from the optical output power monitor 62B (ignores the power control signal).

On the other hand, if receiving the trunk-side input interruption information from the optical input interruption detection circuit 22C, the optical ATT control circuit 42D adjusts the insertion loss of the optical attenuator 42B, according to a power control signal from the optical output power monitor 62B, in a manner to keep constant the optical power of trunk-side optical signal output.

If not receiving the branch-side input interruption information from the optical input interruption detection circuit 32B, the optical ATT control circuit 52D gives priority to interception of an optical signal by setting the insertion loss of the optical attenuator 52B at the maximum value, and does not perform the control based on a power control signal from the optical output power monitor 62B (ignores the power control signal).

On the other hand, if receiving the branch-side input interruption information from the optical input interruption detection circuit 32B, the optical ATT control circuit 52D adjusts the insertion loss of the optical attenuator 52B, according to a power control signal from the optical output power monitor 62B, in a manner to keep constant the optical power of trunk-side optical signal output.

If receiving the trunk-side input interruption information from the optical input interruption detection circuit 22C, the optical output power monitor 62B sends a power control signal to the optical ATT control circuit 42D so as to keep constant the optical output power. On the other hand, if not receiving the trunk-side input interruption information, the optical output power monitor 62B sends no power control signal to the optical ATT control circuit 42D If receiving the branch-side input interruption information from the optical input interruption detection circuit 32B, the optical output power monitor 62B sends a power control signal to the optical ATT control circuit 52D so as to keep constant the optical output power. On the other hand, if not receiving the branch-side input interruption information, the optical output power monitor 62B sends no power control signal to the optical ATT control circuit 52D Further, if receiving input interruption notifications from both of the optical input interruption detection circuits 22C and 32B, the optical output power monitor 62B sends a power control signal to neither of the optical ATT control circuits 42D and 52D.

The optical filter 51C is an optical filter with the same configuration as that of the optical filter 51A, and is arranged in the reverse direction to that of the optical filter 51A. The optical filter 51C combines pass-through light with pass-through-prevented light (the pass-through-prevented light is passed only when the insertion loss of the optical attenuator 52B is small), and outputs the combined light to the optical coupler 62A.

The optical filter 41C is an optical filter with the same configuration as that of the optical filter 41A, and is arranged in the reverse direction to that of the optical filter 41A. The optical filter 41C combines insertion light with insertion-prevented light (the insertion-prevented light is passed only when the insertion loss of the optical attenuator 42B is small), and outputs the combined light to the optical coupler 62A.

Here, the optical ATT control circuit 42D controls the ATT 42B on the basis of a result of detecting an input interruption by the optical input interruption detection circuit 22C. Accordingly, the pass-through degree with respect to a trunk-side optical signal can be adjusted, and as a result, even when an input interruption has occurred on the trunk side, insertion light corresponding to the remaining signal in that case is effectively propagated.

Similarly, the optical switch control circuit 52D controls the ATT 52B on the basis of a result of detecting an input interruption by the optical input interruption detection circuit 32B. Accordingly, the pass-through degree with respect to a trunk-side optical signal can be adjusted, and as a result, even when an input failure has occurred on the branch side, pass-through light corresponding to the remaining signal in that case is effectively propagated.

The "network configuration" and "flow of optical signals" are similar to the contents of their descriptions given, with reference to FIGS. 3 to 5, in the first exemplary embodiment described above.

(Description of Operation)

Next, operation of the optical branching/insertion device 72 shown in FIGS. 7 and 8 will be described, with reference to a flow chart of a FIG. 9.

[Operation Based on Trunk-Side Optical Signal]

Figure 9:
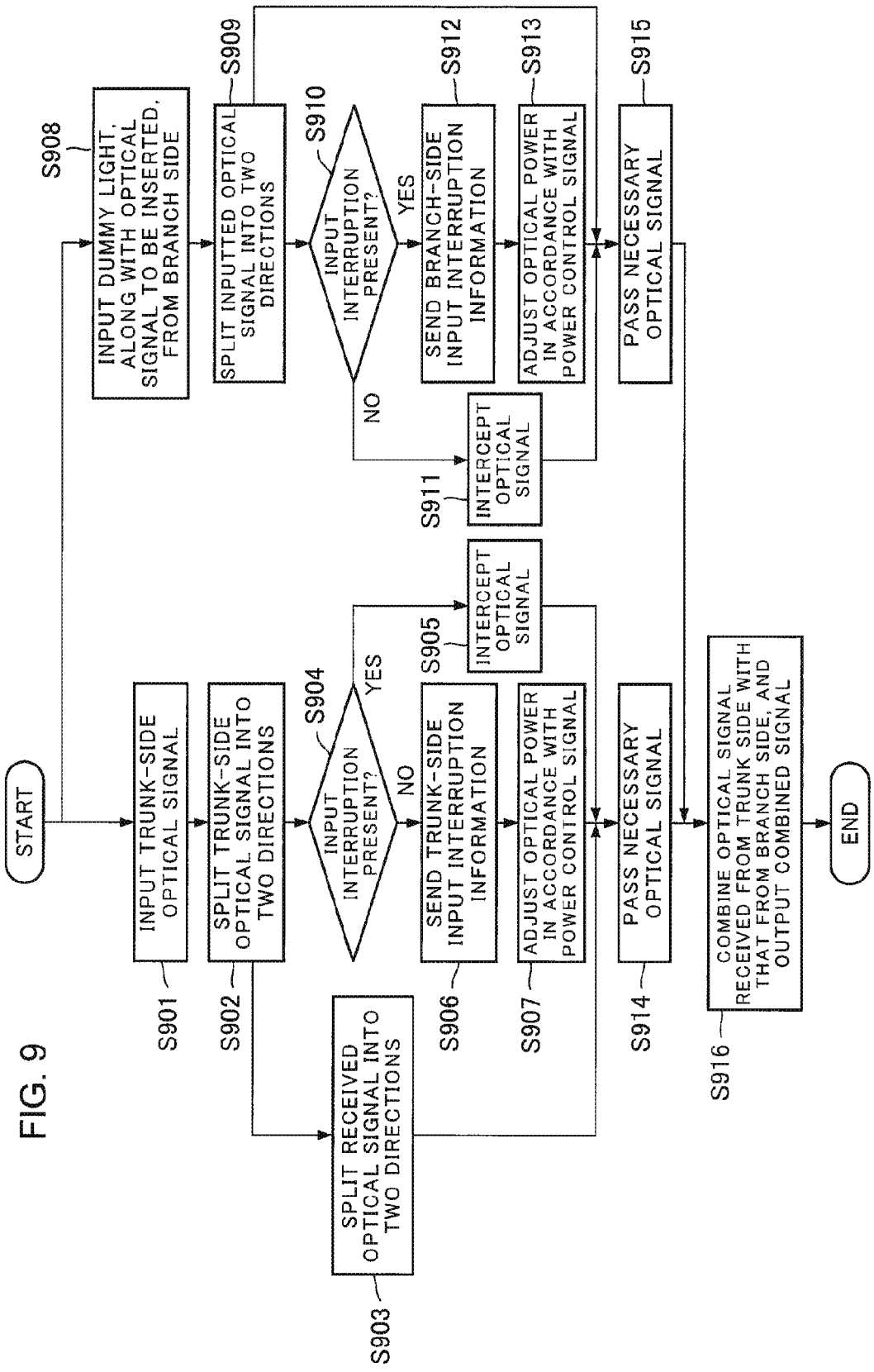
FIG. 9 A flow chart showing an example of operation of the optical branching/insertion device shown in FIGS. 7 and 8
Figure 10:
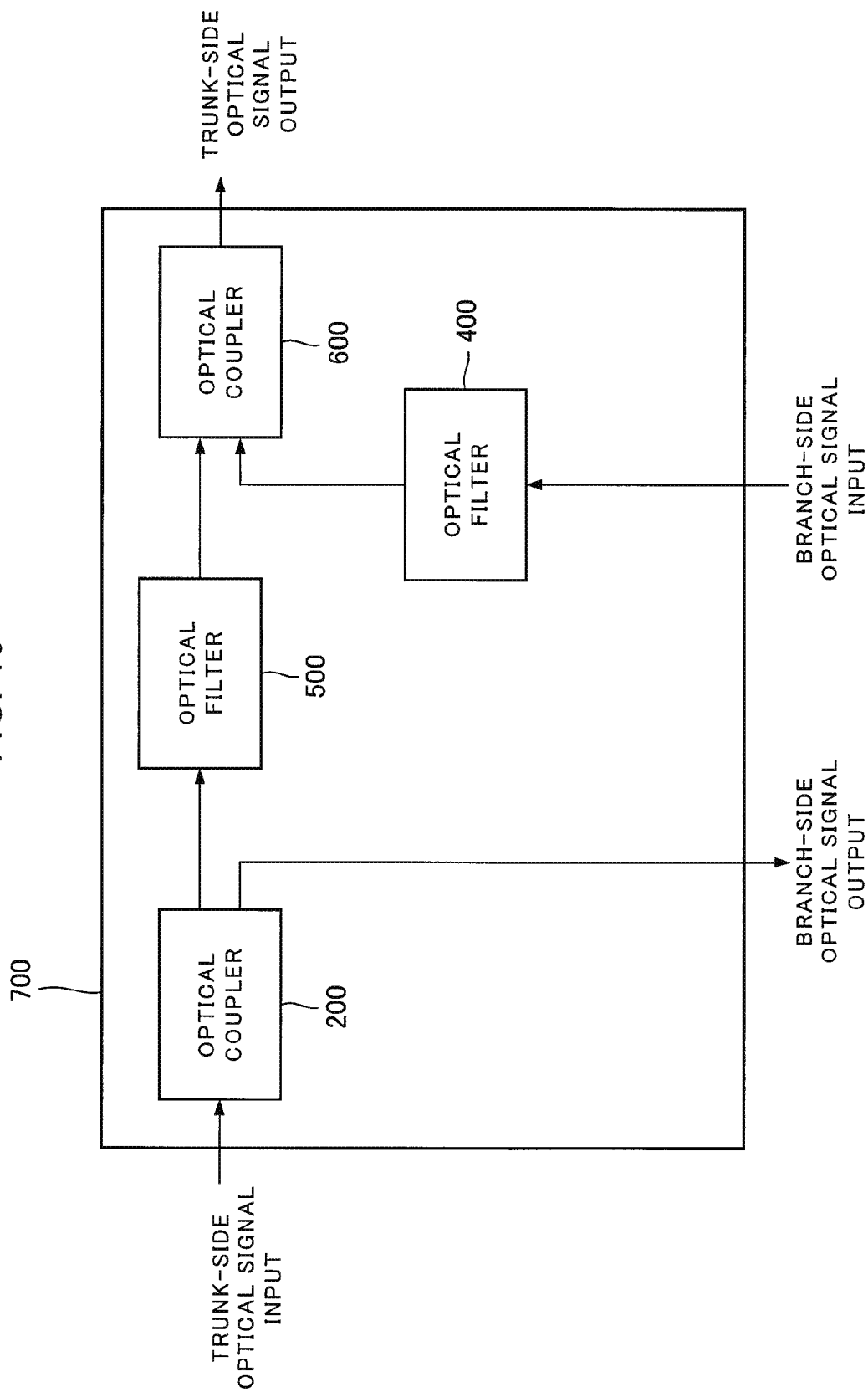
FIG. 10 A block diagram showing a configuration of a typical optical branching/insertion device

First, the optical coupler 21A receives input of a trunk-side optical signal from the outside (FIG. 9: S901). The optical coupler 21A splits the trunk-side optical signal into two directions, one of which is on the side of the optical coupler 21B and the other is on the side of the optical input interruption detection circuit 21C (FIG. 9: S902).

The optical coupler 21B splits the optical signal received from the optical coupler 21A into two directions, one of which is on the side of the optical filter 51A and the other is on the branch side (FIG. 9: S903).

On the basis of the optical signal received from the optical coupler 21A, the optical input interruption detection circuit 21C determines whether or not any input interruption has occurred on the trunk side propagation path (FIG. 9: S904).

If no input interruption has occurred (FIG. 9: NO at S904), regardless of whether it has received a power control signal from the optical output power monitor 62B, the optical ATT control circuit 42D controls the ATT 42B in a manner to set its insertion loss at the maximum value, and thereby interrupts an optical signal (FIG. 9: S905).

If any input interruption has occurred (FIG. 9: YES at S904), the optical input interruption detection circuit 22C sends trunk-side input interruption information to the optical ATT control circuit 42D (FIG. 9: S906).

The optical ATT control circuit 42D having received the trunk-side input interruption information controls the ATT 42B, according to a power control signal received from the optical output power monitor 62B, in a manner to set the insertion loss of the ATT 42B to be small (FIG. 9: S907).

[Operation Based on Branch-Side Optical Signal]

From the branch side, an optical signal to insert is inputted, along with dummy light, to the optical coupler 31A (FIG. 9: S908). The optical coupler 31A splits the inputted optical signal into two directions, one of which is on the side of the optical filter 41A and the other is on the side of the optical input interruption detection circuit 32B (FIG. 9: S909).

On the basis of the optical signal received from the optical coupler 31A, the optical input interruption detection circuit 32B determines whether or not any input interruption has occurred on the branch side propagation path (FIG. 9: S910).

If no input interruption has occurred (FIG. 9: NO at S910), regardless of whether it has received a power control signal from the optical output power monitor 62B, the optical ATT control circuit 52D controls the ATT 52B in a manner to set its insertion loss at the maximum value, and thereby interrupts an optical signal (FIG. 9: S911).

On the other hand, if any input interruption has occurred (FIG. 9: YES at S910), the optical input interruption detection circuit 32B sends branch-side input interruption information to the optical ATT control circuit 52D (FIG. 9: S912).

The optical ATT control circuit 52D having received the branch-side input interruption information controls the ATT 52B, according to a power control signal received from the optical output power monitor 62B, in a manner to set the insertion loss of the ATT 52B to be small (FIG. 9: S913).

[Optical Signal Passing Process Based on Adjusted Pass-Through Degree]

The optical filter 51A sends the optical signal received from the optical coupler 21B (FIG. 9: S903 and S910 to S913) to the optical filter 51C (FIG. 9: S914).

Specifically, when any input interruption has been detected by the optical input interruption detection circuit 32B (FIG. 9: YES at S910), the optical ATT control circuit 52D controls (adjusts) the ATT 52B in a manner to set its insertion loss to be small. Accordingly, to the optical filter 51C, the pass-through-prevented light for supplementing the branch-side optical signal is sent via the ATT 52B, as well as the pass-through light.

On the other hand, when no input interruption has been detected by the optical input interruption detection circuit 32B (FIG. 9: NO at S910), the optical ATT control circuit 52D controls the ATT 52B in a manner to set its insertion loss at the maximum value. Accordingly, the pass-through-prevented light is intercepted, and therefore, only the pass-through light is sent to the optical filter 51C.

Similarly, the optical filter 41A sends the optical signal received from the optical coupler 31A (FIG. 9: S909 and S904 to S907) to the optical filter 41C (FIG. 9: S915).

Specifically, when any input interruption has been detected by the optical input interruption detection circuit 22C (FIG. 9: YES at S904), the optical ATT control circuit 42D controls (adjusts) the ATT 42B in a manner to set its insertion loss to be small. Accordingly, to the optical filter 41C, the insertion-prevented light for supplementing the trunk-side optical signal (compensation light: dummy light) is sent via the ATT 42B, as well as the insertion light.

On the other hand, when no input interruption has been detected by the optical input interruption detection circuit 22C (FIG. 9: NO at S904), the optical ATT control circuit 42D controls the ATT 42B in a manner to set its insertion loss at the maximum value. Accordingly, the insertion-prevented light (compensation light) is intercepted, and therefore, only the insertion light is sent to the optical filter 41C.

The optical coupler 62A combines the optical signals received from respectively the optical filters 51C and 41C, and then sends the combined signal to the outside (FIG. 9: S916).

Although the above description of operation has been made, for convenience, in numerical order according to the numbers assigned in FIG. 9 (S901 to S916), contents of the operation of the optical branching/insertion device 72 according to the second exemplary embodiment is not limited to that order.

Further, the configuration may be such that the contents to be performed in the respective processes corresponding to the steps S901 to S916 (FIG. 9) described above are programmed, and the series of control programs are realized by a computer (including, for example, a logic device, a CPU (Central Processing Unit) and the like).

The above-described programs are delivered, for example, by being stored in a computer readable non-transitory recording medium such as a flexible disk, a CD-ROM and an MO, or via a network.

Effect of Second Exemplary Embodiment

In the optical branching/insertion device 72 according to the second exemplary embodiment, the optical switches 41B and 51B have been replaced by respectively the optical attenuators (ATTs) 42B and 52B. The optical ATT control circuits 42D and 52D control (adjust), respectively, the insertion loss of the optical attenuator (ATT) 42B and that of the ATT 52B, on the basis of a power control signal sent as necessary from the optical output power monitor 62B and respective pieces of input interruption information sent as necessary from the optical input interruption detection circuits 22C and 32B.

As a result, according to the optical branching/insertion device 72, even when any input failure has occurred on either or both of the trunk-side and branch-side propagation paths, it is possible to precisely adjust the total power of a signal from input to output and thus maintain its initial level. Accordingly, it becomes possible to effectively relay a remaining signal to send.

Therefore, by applying the optical branching/insertion device 72, which suppresses variation in the power of a remaining optical signal due to an input failure, to a submarine cable system and the like, it becomes possible, even if an input failure occurs, to effectively propagate a remaining significant optical signal on the subsequent path.

The exemplary embodiments described above are preferable specific examples of an optical branching/insertion device, an optical branching/insertion method and a recording medium, where various restrictions which are technically preferable may have been made. However, unless any particular description restricting the present invention is given, the technological scope of the present invention is not limited to those aspects.

The following supplementary notes are those into which the essential points of novel technical matters of the above-described exemplary embodiments are organized, but the present invention is not limited to the following supplementary notes.

(Supplementary Note 1)

An optical branching/insertion device comprising:

trunk-side detection/branching means for detecting a failure of a trunk-side optical signal inputted from the trunk side and outputting detection result of the failure of the trunk-side optical signal as a first detection result, and for splitting the trunk-side optical signal and sending the split signals respectively to the trunk side and to the branch side;

branch-side detection means for detecting a failure of a branch-side optical signal inserted from the branch side and outputting detection result of the failure of the branch-side optical signal as a second detection result, and for sending the branch-side optical signal as an insertion signal;

insertion signal adjustment means for outputting the insertion signal after adjusting pass-through degree of the insertion signal on the basis of the first detection result, as a first adjusted signal;

trunk signal adjustment means for outputting the trunk-side optical signal after adjusting pass-through degree of the trunk-side optical signal on the basis of the second detection result, as a second adjusted signal; and combining/output means for outputting, to the outside, an optical signal into which the first adjusted signal and the second adjusted signal are combined together, as a trunk-side output optical signal.

(Supplementary Note 2)

The optical branching/insertion device according to supplementary note 1, wherein the trunk signal adjustment means:

when no failure occurrence of the branch-side optical signal is indicated by the second detection result, passes only a signal component of a first specific wavelength out of the trunk-side optical signal; and when any failure occurrence of the branch-side optical signal is indicated by the second detection result, passes also a signal component of a second specific wavelength, as well as the signal component of the first specific wavelength, out of the trunk-side optical signal.

(Supplementary Note 3)

The optical branching/insertion device according to supplementary note 2, wherein the insertion signal adjustment means:

when no failure occurrence of the trunk-side optical signal is indicated by the first detection result, passes only a signal component of the second specific wavelength out of the insertion signal; and when any failure occurrence of the trunk-side optical signal is indicated by the first detection result, passes also a signal component of the first specific wavelength, as well as the signal component of the second specific wavelength, out of the insertion signal.

(Supplementary Note 4)

The optical branching/insertion device according to any one of supplementary notes 1 to 3, wherein the insertion signal adjustment means comprises a first optical filter with one input and two outputs, a first optical switch for performing passing or interception of an optical signal, a second optical filter with two inputs and one output, and a first optical switch control unit for controlling the first optical switch on the basis of the first detection result.

(Supplementary Note 5)

The optical branching/insertion device according to any one of supplementary notes 1 to 3, wherein the trunk signal adjustment means comprises a third optical filter with one input and two outputs, a second optical switch for performing passing or interception of an optical signal, a fourth optical filter with two inputs and one output, and a second optical switch control unit for controlling the second optical switch on the basis of the second detection result.

(Supplementary Note 6)

The optical branching/insertion device according to supplementary note 1, wherein:

the combining/output means further comprises an output-monitoring/sending unit which monitors the power of the trunk-side output optical signal, thereby generating a power control signal, and sends the power control signal to the insertion signal adjustment means and to the trunk signal adjustment means; and the insertion signal adjustment means and the trunk signal adjustment means perform the respective adjustments on the basis of the power control signal.

(Supplementary Note 7)

The optical branching/insertion device according to supplementary note 6, wherein:

the insertion signal adjustment means performs the adjustment based on the power control signal only when any failure occurrence of the trunk-side optical signal is indicated by the first detection result; and the trunk signal adjustment means performs the adjustment based on the power control signal only when any failure occurrence of the branch-side optical signal is indicated by the second detection result.

(Supplementary Note 8)

The optical branching/insertion device according to supplementary notes 6 or 7, wherein:

when no failure occurrence of the trunk-side optical signal is indicated by the first detection result, the insertion signal adjustment means intercepts a signal component of the first specific wavelength out of the insertion signal; and when no failure occurrence of the branch-side optical signal is indicated by the second detection result, the trunk signal adjustment means intercepts a signal component of the second specific wavelength out of the trunk-side optical signal (Supplementary Note 9)

The optical branching/insertion device according to any one of supplementary notes 6 to 8, wherein the insertion signal adjustment means comprises:

a first optical filter with one input and two outputs, and a first optical attenuator which attenuates an optical signal; and a second optical filter with two inputs and one output, and a first optical attenuator control unit which controls the first optical attenuator on the basis of the first detection result.

(Supplementary Note 10)

The optical branching/insertion device according to any one of supplementary notes 6 to 9, wherein the trunk signal adjustment means comprises:

a third optical filter with one input and two outputs, and a second optical attenuator which attenuates an optical signal; and a fourth optical filter with two inputs and one output, and a second optical attenuator control unit which controls the second optical attenuator on the basis of the second detection result.

(Supplementary Note 11)

The optical branching/insertion device according to any one of supplementary notes 1 to 10, wherein the trunk-side detection/branching means comprises:

a first optical coupler which splits the trunk-side optical signal and sends the split signals in respective ones of two directions;

a first optical input interruption detection unit which detects a failure of the trunk-side optical signal received from the first optical coupler and sends detection result of the failure of the trunk-side optical signal as the first detection result to the insertion signal adjustment means; and a second optical coupler which splits the trunk-side optical signal received from the first optical coupler into two directions.

(Supplementary Note 12)

The optical branching/insertion device according to any one of supplementary notes 1 to 11, wherein the branch-side detection means comprises:

a third optical coupler which splits the branch-side optical signal and sends the split signals in respective ones of two directions;

a second optical input interruption detection unit which detects a failure of the branch-side optical signal received from the third optical coupler and sends detection result of the failure of the branch-side optical signal as the second detection result to the trunk signal adjustment means.

(Supplementary Note 13)

An optical branching/insertion method comprising:

detecting a failure of a trunk-side optical signal inputted from the trunk side and outputting detection result of the failure of the trunk-side optical signal as a first detection result, and splitting the trunk-side optical signal and sending the split signals respectively to the trunk side and to the branch side;

detecting a failure of a branch-side optical signal inserted from the branch side and outputting detection result of the failure of the branch-side optical signal as a second detection result, and sending the branch-side optical signal as an insertion signal;

outputting the insertion signal with its pass-through degree having been adjusted on the basis of the first detection result, as a first adjusted signal;

outputting the trunk-side optical signal with its pass-through degree having been adjusted on the basis of the first detection result, as a second adjusted signal; and outputting, to the outside, an optical signal into which the first adjusted signal and the second adjusted signal are combined together, as a trunk-side output optical signal.

(Supplementary Note 14)

The optical branching/insertion method according to supplementary note 13, comprising:

when no failure occurrence of the branch-side optical signal is indicated by the second detection result, passing only a signal component of a first specific wavelength out of the trunk-side optical signal; and when any failure occurrence of the branch-side optical signal is indicated by the second detection result, passing also a signal component of a second specific wavelength, as well as the signal component of the first specific wavelength, out of the trunk-side optical signal.

(Supplementary Note 15)

The optical branching/insertion method according to supplementary note 13, comprising:

when no failure occurrence of the trunk-side optical signal is indicated by the first detection result, passing only a signal component of the second specific wavelength out of the insertion signal; and when any failure occurrence of the trunk-side optical signal is indicated by the first detection result, passing also a signal component of the first specific wavelength, as well as the signal component of the second specific wavelength, out of the insertion signal.

(Supplementary Note 16)

A recording medium storing an optical branching/insertion program for causing a computer to realize:

a trunk-side detection/branching function for detecting a failure of a trunk-side optical signal inputted from the trunk side and outputting detection result of the failure of the trunk-side optical signal as a first detection result, and for splitting the trunk-side optical signal and sending the split signals respectively to the trunk side and to the branch side;

a branch-side detection function for detecting a failure of a branch-side optical signal inserted from the branch side and outputting detection result of the failure of the branch-side optical signal as a second detection result, and for sending the branch-side optical signal as an insertion signal;

an insertion signal adjustment function for outputting the insertion signal with pass-through degree of the insertion signal having been adjusted on the basis of the first detection result, as a first adjusted signal;

a trunk signal adjustment function for outputting the trunk-side optical signal with pass-through degree of the trunk-side optical signal having been adjusted on the basis of the second detection result, as a second adjusted signal; and a combining/output function for outputting, to the outside, an optical signal into which the first adjusted signal and the second adjusted signal are combined together, as a trunk-side output optical signal.

(Supplementary Note 17)

The recording medium according to supplementary note 16, wherein the optical branching/insertion program causes the computer to realize:

a function for, when no failure occurrence of the branch-side optical signal is indicated by the second detection result, passing only a signal component of a first specific wavelength out of the trunk-side optical signal; and a function for, when any failure occurrence of the branch-side optical signal is indicated by the second detection result, passing also a signal component of a second specific wavelength, as well as the signal component of the first specific wavelength, out of the trunk-side optical signal.

(Supplementary Note 18)

The recording medium according to supplementary note 16, wherein the optical branching/insertion program causes the computer to realize:

a second signal insertion function for, when no failure occurrence of the trunk-side optical signal is indicated by the first detection result, passing only a signal component of the second specific wavelength out of the insertion signal; and a multiple signals insertion function for, when any failure occurrence of the trunk-side optical signal is indicated by the first detection result, passing also a signal component of the first specific wavelength, as well as the signal component of the second specific wavelength, out of the insertion signal.

The present invention has been described above with reference to the exemplary embodiments, but the present invention is not limited to the above-described exemplary embodiments. To the configurations and details of the present invention, various modifications which can be understood by those skilled in the art may be made within the scope of the present invention.

The present application is based upon and claims the benefit of priority from Japanese Patent Application No. 2013-009831, filed on Jan. 23, 2013, the disclosure of which is incorporated herein in its entirety by reference.

INDUSTRIAL APPLICABILITY

The optical branching/insertion devices according to the present invention are applicable to such as a submarine cable system which is required to have very high reliability in international communications and the like.

REFERENCE SIGNS LIST 21, 22 trunk-side detection/branching means
21A, 21B optical coupler
21C, 22C optical input interruption detection circuit
31, 32 branch-side detection means
31A optical coupler
31B, 32B optical input interruption detection circuit
41, 42 insertion signal adjustment means
41A, 41C optical filter
41B optical switch
41D optical switch control circuit
42B ATT (optical attenuator)
42D optical ATT control circuit
51, 52 trunk signal adjustment means
51A, 51C optical filter
51B optical switch
51D optical switch control circuit
52B ATT (optical attenuator)
52D optical ATT control circuit
61, 62 combining/output means
61A, 62A optical coupler
62B optical output power monitor
71, 72, G optical branching/insertion device

The invention claimed is:

1. An optical branching/insertion device comprising:
a trunk-side detection/branching unit which detects a failure of a trunk-side optical signal inputted from the trunk side, outputs detection result of the failure of the trunk-side optical signal as a first detection result, splits the trunk-side optical signal, and sends the split signals respectively to the trunk side and to the branch side;
a branch-side detection unit which detects a failure of a branch-side optical signal inserted from the branch side, outputs detection result of the failure of the branch-side optical signal as a second detection result, and sends the branch-side optical signal as an insertion signal;
an insertion signal adjustment unit which outputs the insertion signal after adjusting pass-through degree of the insertion signal on the basis of the first detection result, as a first adjusted signal;
a trunk signal adjustment unit which outputs the trunk-side optical signal after adjusting pass-through degree of the trunk-side optical signal on the basis of the second detection result, as a second adjusted signal; and
a combining/output unit which outputs, an optical signal into which the first adjusted signal and the second adjusted signal are combined together, as a trunk-side output optical signal,
wherein the insertion signal adjustment unit comprises:
a first optical filter which divides the insertion signal sent by the branch-side detection unit into a first signal component of a first specific wavelength and a second signal component of a second specific wavelength, and outputs the first and second signal components;
a first optical switch which performs passing or interception of the first signal component outputted from the first optical filter based on the first detection result; and
a second optical filter which combines the second signal component outputted from the first optical filter and the first signal component outputted from the first optical switch, and outputs a combined signal as the first adjusted signal; and
wherein the trunk signal adjustment unit comprises:
a third optical filter which divides the truck-side optical signal sent by the trunk-side detection/branching unit to the trunk side into a third signal component of the first specific wavelength and a fourth signal component of the second specific wavelength, and outputs the third and fourth signal components;
a second optical switch which performs passing or interception of the fourth signal component outputted from the third optical filter based on the second detection result; and
a fourth optical filter which combines the third signal component outputted from the third optical filter and the fourth signal component outputted from the second optical switch, and outputs a combined signal as the second adjusted signal.

2. The optical branching/insertion device according to claim 1, wherein the trunk signal adjustment unit:
when no failure occurrence of the branch-side optical signal is indicated by the second detection result, passes only a signal component of the first specific wavelength out of the trunk-side optical signal; and
when any failure occurrence of the branch-side optical signal is indicated by the second detection result, passes a signal component of the second specific wavelength, as well as the signal component of the first specific wavelength, out of the trunk-side optical signal.

3. The optical branching/insertion device according to claim 2, wherein the insertion signal adjustment unit:
when no failure occurrence of the trunk-side optical signal is indicated by the first detection result, passes only a signal component of the second specific wavelength out of the insertion signal; and
when any failure occurrence of the trunk-side optical signal is indicated by the first detection result, passes also a signal component of the first specific wavelength, as well as the signal component of the second specific wavelength, out of the insertion signal.

4. The optical branching/insertion device according to claim 1, wherein the trunk-side detection/branching unit comprises:
a first optical coupler which splits the trunk-side optical signal and sends the split signals in respective ones of two directions;
a first optical input interruption detection circuit which detects a failure of the trunk-side optical signal received from the first optical coupler and sends detection result of the failure of the trunk-side optical signal as the first detection result to the insertion signal adjustment unit; and
a second optical coupler which splits the trunk-side optical signal received from the first optical coupler into two directions.

5. The optical branching/insertion device according to claim 1, wherein the branch-side detection unit comprises:
a third optical coupler which splits the branch-side optical signal and sends the split signals in respective ones of two directions;
a second optical input interruption detection circuit which detects a failure of the branch-side optical signal received from the third optical coupler and sends detection result of the failure of the branch-side optical signal as the second detection result to the trunk signal adjustment unit.

6. An optical branching/insertion device comprising:
a trunk-side detection/branching unit which detects a failure of a trunk-side optical signal inputted from the trunk side, outputs detection result of the failure of the trunk-side optical signal as a first detection result, splits the trunk-side optical signal, and sends the split signals respectively to the trunk side and to the branch side;
a branch-side detection unit which detects a failure of a branch-side optical signal inserted from the branch side, outputs detection result of the failure of the branch-side optical signal as a second detection result, and sends the branch-side optical signal as an insertion signal;
an insertion signal adjustment unit which outputs the insertion signal after adjusting pass-through degree of the insertion signal on the basis of the first detection result, as a first adjusted signal;
a trunk signal adjustment unit which outputs the trunk-side optical signal after adjusting pass-through degree of the trunk-side optical signal on the basis of the second detection result, as a second adjusted signal; and
a combining/output unit which outputs an optical signal into which the first adjusted signal and the second adjusted signal are combined together, as a trunk-side output optical signal, wherein:
the combining/output unit further comprises an output-monitoring/sending unit which monitors power of the trunk-side output optical signal, thereby generating a power control signal, and sends the power control signal to the insertion signal adjustment unit and to the trunk signal adjustment unit; and
the insertion signal adjustment unit and the trunk signal adjustment unit perform respective adjustments on the basis of the power control signal.

7. The optical branching/insertion device according to claim 6, wherein:
when no failure occurrence of the trunk-side optical signal is indicated by the first detection result, the insertion signal adjustment unit intercepts a signal component of a first specific wavelength out of the insertion signal; and
when no failure occurrence of the branch-side optical signal is indicated by the second detection result, the trunk signal adjustment unit intercepts a signal component of a second specific wavelength out of the trunk-side optical signal.

8. The optical branching/insertion device according to claim 6, wherein:
the insertion signal adjustment unit performs the adjustment based on the power control signal only when any failure occurrence of the trunk-side optical signal is indicated by the first detection result; and
the trunk signal adjustment unit performs the adjustment based on the power control signal only when any failure occurrence of the branch-side optical signal is indicated by the second detection result.

9. The optical branching/insertion device according to claim 8, wherein:
when no failure occurrence of the trunk-side optical signal is indicated by the first detection result, the insertion signal adjustment unit intercepts a signal component of a first specific wavelength out of the insertion signal; and
when no failure occurrence of the branch-side optical signal is indicated by the second detection result, the trunk signal adjustment unit intercepts a signal component of a second specific wavelength out of the trunk-side optical signal.

10. The optical branching/insertion device according to claim 6, wherein the insertion signal adjustment unit comprises:
a first optical filter with one input and two outputs;
a first optical attenuator which attenuates an optical signal;
a second optical filter with two inputs and one output; and
a first optical attenuator control circuit which controls the first optical attenuator on the basis of the first detection result.

11. The optical branching/insertion device according to claim 6, wherein the trunk signal adjustment unit comprises:
a third optical filter with one input and two outputs;
a second optical attenuator which attenuates an optical signal;
a fourth optical filter with two inputs and one output; and
a second optical attenuator control circuit which controls the second optical attenuator on the basis of the second detection result.

12. An optical branching/insertion method comprising:
detecting, by a first optical input interruption detection circuit, a failure of a trunk-side optical signal inputted from the trunk side, and outputting, by the first optical input interruption detection circuit, detection result of the failure of the trunk-side optical signal as a first detection result;
splitting, by a first optical coupler, the trunk-side optical signal, and sending, by the first optical coupler, the split signals respectively to the trunk side and to the branch side;
detecting, by a second optical input interruption detection circuit, a failure of a branch-side optical signal inserted from the branch side, and outputting, by the second optical input interruption detection circuit, detection result of the failure of the branch-side optical signal as a second detection result;
sending, by a second optical coupler, the branch-side optical signal as an insertion signal;
after a first optical switch, controlled by a first control circuit, adjusts pass-through degree of the insertion signal on the basis of the first detection result, outputting, by an first optical filter, the insertion signal as a first adjusted signal;
after a second optical switch, controlled by a second control circuit, adjusts pass-through degree of the trunk-side optical signal on the basis of the second detection result, outputting, by a second optical filter, the trunk-side optical signal as a second adjusted signal; and
combining, by a third optical coupler, the first adjusted signal and the second adjusted signal to generate a combined signal, and outputting, by the third optical coupler, the combined signal as a trunk-side output optical signal,
monitoring, by an optical output power monitor, power of the trunk-side output optical signal, generating, by the optical output power monitor, a power control signal, and sending, by the optical output power monitor, the power control signal to the first and second control circuits, wherein the first and second control circuits perform respective adjustments on the basis of the power control signal.

13. The optical branching/insertion method according to claim 12, wherein:
when no failure occurrence of the trunk-side optical signal is indicated by the first detection result, intercepting, by the first optical switch, a signal component of a first specific wavelength out of the insertion signal; and
when no failure occurrence of the branch-side optical signal is indicated by the second detection result, intercepting, by the second optical switch, a signal component of a second specific wavelength out of the trunk-side optical signal.

14. The optical branching/insertion method according to claim 12, wherein:
performing, by the first optical switch, the adjustment based on the power control signal only when any failure occurrence of the trunk-side optical signal is indicated by the first detection result; and
performing, by the second optical switch, the adjustment based on the power control signal only when any failure occurrence of the branch-side optical signal is indicated by the second detection result.

15. The optical branching/insertion method according to claim 14, wherein:
when no failure occurrence of the trunk-side optical signal is indicated by the first detection result, intercepting, by the first optical switch, a signal component of a first specific wavelength out of the insertion signal; and when no failure occurrence of the branch-side optical signal is indicated by the second detection result, intercepting, by the second optical switch, a signal component of a second specific wavelength out of the trunk-side optical signal.

\* \* \* \* \*